(12) United States Patent
Wheeler

(10) Patent No.: US 8,799,810 B1
(45) Date of Patent: Aug. 5, 2014

(54) STABILITY REGION FOR A USER INTERFACE

(75) Inventor: Aaron Joseph Wheeler, San Francisco, CA (US)

(73) Assignee: Google Inc., Mountain View, CA (US)

( * ) Notice: Subject to any disclaimer, the term of this patent is extended or adjusted under 35 U.S.C. 154(b) by 139 days.

(21) Appl. No.: 13/422,940

(22) Filed: Mar. 16, 2012

(51) Int. Cl.
*G06F 3/048* (2013.01)
(52) U.S. Cl.
USPC ......... 715/785; 386/242; 396/55; 348/208.99
(58) Field of Classification Search
USPC .......... 715/785; 386/242; 396/55; 348/208.5, 348/208.6, 208.7, 207.99, 208.99
See application file for complete search history.

(56) References Cited

U.S. PATENT DOCUMENTS

| | | | |
|---|---|---|---|
| 5,572,317 A * | 11/1996 | Parker et al. | 356/139.06 |
| 6,167,143 A * | 12/2000 | Badique | 382/107 |
| 6,515,799 B2 | 2/2003 | Ishijima et al. | |
| 7,474,335 B2 | 1/2009 | Basson et al. | |
| 7,796,873 B2 | 9/2010 | Uenaka et al. | |
| 7,932,925 B2 | 4/2011 | Inbar et al. | |
| 8,284,264 B2 * | 10/2012 | Tamaru et al. | 348/208.99 |
| 2007/0297687 A1 * | 12/2007 | Yamasaki | 382/255 |
| 2008/0266405 A1 * | 10/2008 | Tachibana et al. | 348/208.6 |
| 2008/0276196 A1 * | 11/2008 | Tang | 715/800 |
| 2009/0040318 A1 * | 2/2009 | Brosnan et al. | 348/208.4 |
| 2010/0299630 A1 | 11/2010 | McCutchen et al. | |
| 2012/0092348 A1 * | 4/2012 | McCutchen | 345/474 |
| 2012/0105473 A1 * | 5/2012 | Bar-Zeev et al. | 345/633 |

* cited by examiner

*Primary Examiner* — Boris Pesin
*Assistant Examiner* — Justin Lee
(74) *Attorney, Agent, or Firm* — McDonnell Boehnen Hulbert & Berghoff LLP

(57) ABSTRACT

Exemplary methods and media relate to controlled movement of a viewing window across a graphical user-interface using an orientation-tracked display-device. The viewing window in an exemplary method may move in accordance with detected change in the physical orientation of the display-device. When the physical orientation of the display-device is sufficiently motionless, the position of the viewing window may be held fixed with respect to the graphical user-interface and a stability region may be established in the viewing window. The viewing window may continue to remain still as long as the physical orientation of the display-device remains within a range of orientations represented by the stability region. Then, the viewing window may begin moving again with respect to the graphical user-interface when the orientation moves outside of the range defined by the stability region.

30 Claims, 16 Drawing Sheets

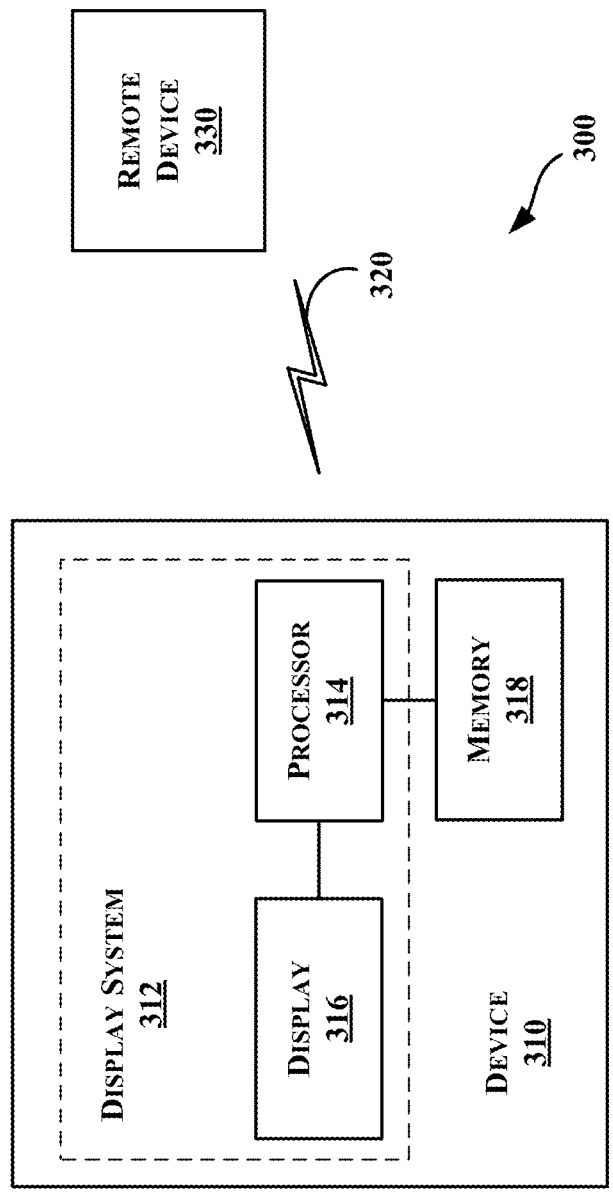

STABILITY REGION FOR A USER INTERFACE

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. Over time, the manner in which these devices are providing information to users is becoming more intelligent, more efficient, more intuitive, and/or less obtrusive.

The trend toward miniaturization of computing hardware and peripherals, as well as of sensors, detectors, and image and audio processors, among other technologies, has helped open up a field sometimes referred to as "wearable computing." In the area of image and visual processing and production, in particular, it has become possible to consider wearable displays that place a very small image display element close enough to a wearer's (or user's) eye(s) such that the displayed image fills or nearly fills the user's field of vision, and appears as a normal sized image, such as might be displayed on a traditional image display-device. Such technology may be referred to as "near-eye displays."

Near-eye displays, also sometimes called "head-mounted displays" (HMDs), are fundamental components of wearable display-devices. A head-mounted display-device places one or more graphic displays close to a wearer's eye or eyes. A wearable computer processing system may generate the images on a display. Further, head-mounted display-devices may be as small as a pair of glasses or as large as a helmet.

Emerging and anticipated uses of wearable display-devices include applications in which users interact in real time with an augmented or virtual reality. Such applications can be mission-critical or safety-critical, such as in a public safety or aviation setting. The applications can also be recreational, such as interactive gaming.

SUMMARY

In one aspect, an exemplary method provides for controlled movement of a viewing window across a graphical user-interface (GUI). Such an exemplary method involves causing a display-device to display the viewing window, in which the viewing window provides a view of a portion of the GUI. Also, the method involves programmatically establishing a stability region at a default position with respect to the viewing window. Change in physical orientation of the display-device is detected and, in accordance with the detected change in physical orientation, (i) the stability region is moved with respect to the viewing window and (ii) the viewing window is moved with respect to the GUI at a first movement rate. The exemplary method further involves determining that the stability region has moved at least a predefined non-zero distance from the default position. In response to determining that the first stability region has moved at least the predefined non-zero distance from the default position, the exemplary method involves moving the viewing window with respect to the GUI at a second movement rate in accordance with continued change in physical orientation of the display-device. Also, a threshold reduction of the continued change in physical orientation of the display-device is detected; and at least in response to detecting the threshold reduction of the continued change in physical orientation of the display-device, the viewing window is again moved with respect to the GUI at the first movement rate.

In another aspect, an exemplary method for controlled movement of a viewing window across a GUI involves causing a display-device to display the viewing window, wherein the viewing window provides a view of a portion of the GUI. Change in physical orientation of the display-device is also detected and the viewing window is moved with respect to the GUI in accordance with the detected change in physical orientation of the display-device. Next, the method involves detecting threshold reduction of the change in physical orientation of the display-device. Then, at least in response to detecting the threshold reduction of the change in physical orientation of the display-device, the method involves stopping the movement of the viewing window with respect to the GUI and programmatically establishing a stability region at a default position with respect to the viewing window. The exemplary method then involves moving the stability region with respect to the viewing window in accordance with continued change in physical orientation of the display-device, without moving the viewing window with respect to the GUI. Further, the method involves determining that the stability region has moved at least a predefined non-zero distance from the default position and, in response to determining that the stability region has moved at least the predefined non-zero distance from the default position, moving the viewing window with respect to the GUI in accordance with the continued change in physical orientation of the display-device.

In yet another aspect, an exemplary method for controlled movement of a viewing window across a GUI involves causing a display-device to display the viewing window, wherein the viewing window shows a portion of the GUI, and programmatically establishing in the viewing window (i) a reticle at a default position with respect to the viewing window and (ii) a first stability region, wherein the reticle at the default position is encompassed by the first stability region. This exemplary method also involves detecting change in physical orientation of the display-device and, in accordance with the detected change in physical orientation, moving the reticle with respect to the viewing window and (ii) moving the viewing window with respect to the GUI at a first movement rate. The method additionally involves determining that the reticle has thereby moved outside of the stability region. In response to determining that the reticle has moved outside of the stability region, the method involves moving the viewing window with respect to the GUI at a second movement rate, in accordance with continued change in physical orientation of the display-device. The method further involves detecting a threshold reduction of the continued change in physical orientation of the display-device and, at least in response to detecting the threshold reduction of the continued change in physical orientation of the display-device, moving the viewing window with respect to the GUI at the first movement rate.

In a further aspect, an exemplary non-transitory computer-readable medium has instructions stored therein, which are executable by a processor to cause a display-device to perform functions for controlled movement of a viewing window across a GUI. The functions include displaying the viewing window, wherein the viewing window defines a displayed portion of the GUI; programmatically establishing at a default position with respect to the viewing window a first stability region; and detecting change in physical orientation of the display-device. The functions also include moving the first stability region with respect to the viewing window in accordance with the detected change in physical orientation of the display-device and moving the viewing window with respect to the GUI at a first movement rate. Further, the functions include determining that the first stability region has thereby moved at least a predefined non-zero distance from the default position and, in response to determining that the first stability region has moved at least the predefined non-zero distance from the default position, moving the viewing window with respect to the GUI at a second movement rate in accordance with continued change in physical orientation of the display-device. Moreover, the instructions are also executable to cause the display-device to (i) detect a threshold reduction of the continued change in physical orientation of the display-device and (ii) in response to at least detecting the threshold reduction of the continued change in physical orientation of the display-device, move the viewing window with respect to the GUI at the first movement rate.

These as well as other aspects, advantages, and alternatives will become apparent to those of ordinary skill in the art by reading the following detailed description, with reference where appropriate to the accompanying drawings.

BRIEF DESCRIPTION OF THE DRAWINGS

FIG. 3 is a simplified block diagram of an example computer network infrastructure.

DETAILED DESCRIPTION

Figure 1A:
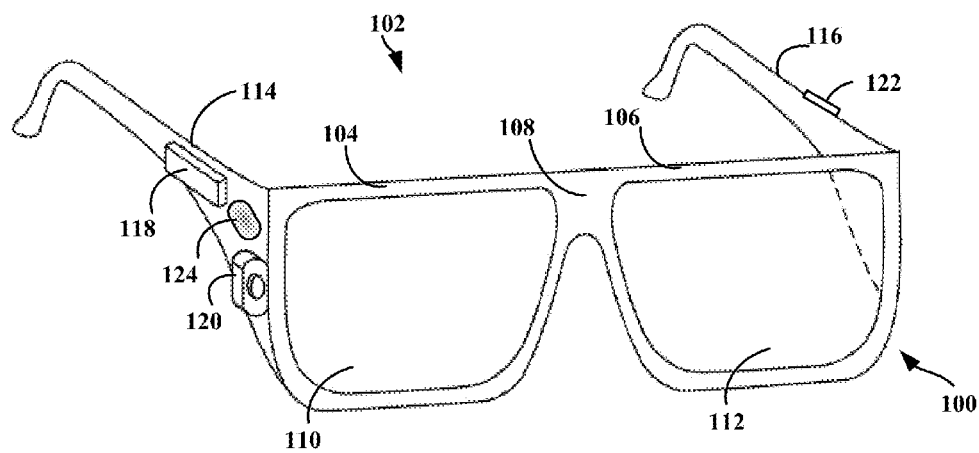
FIG. 1A illustrates an example display system.

In the following detailed description, reference is made to the accompanying figures, which form a part thereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

Exemplary methods and systems are described herein. It should be understood that the word "exemplary" is used herein to mean "serving as an example, instance, or illustration." Any embodiment or feature described herein as "exemplary" is not necessarily to be construed as preferred or advantageous over other embodiments or features. The exemplary embodiments described herein are not meant to be limiting. It will be readily understood that certain aspects of the disclosed systems and methods can be arranged and combined in a wide variety of different configurations, all of which are contemplated herein.

Some of the following exemplary embodiments describe a display-device performing processing, detection, and displaying method steps. In the example of a display-device that is a wearable computer with integral movement sensors, this may be the case. However, processing and detection may be performed by any processing and detection system in communication with the display-device. For example, a remotely connected server system may programmatically establish and move the stability region and then notify the display-device when the stability region moves beyond the predefined distance. As another example, the physical orientation of the display-device may be tracked by remotely-connected detection means (for example, a camera observing the display-device). Then the display-device may receive indications of its physical orientation from the remotely-connected detection means.

1. Overview

A physically-movable display-device, such as a head-mounted display-device for instance, may change the content that it displays in response to detected changes in the display-device's physical orientation. For example, a display-device that displays a portion of GUI may change which portion of the GUI it displays, based on the direction that the display-device is facing. In particular, such a display-device may display a viewing window that shows a portion of a GUI and move the viewing window across the GUI in accordance with detected changes in physical orientation (e.g., moving the viewing window up the GUI when the display-device physically turns upward).

When such a display-device remains relatively still, however, unintentional physical movements may produce undesirable movement in the displayed content. For example, the wearer of a head-mounted display-device may attempt to hold their head relatively still (for instance, to examine a certain portion of the GUI.) However, a typical wearer may have difficulty keeping their head entirely motionless, and involuntary head-movements may produce corresponding viewing-window movements, making it challenging for the user to closely examine the GUI.

To help alleviate this issue, a display-device may be configured to detect when its physical orientation is relatively still, and responsively to slow the movement of the viewing window with respect to the GUI. In some cases, the display-device may be configured to stop the movement altogether in response to detecting that its orientation is relatively still. In practice, a display-device may be considered relatively still when its orientation remains essentially unchanged (i.e., within a few degrees of a stable orientation) for a defined period of time.

While the display-device's physical orientation remains relatively still, the display-device may continue to move the viewing window at the reduced movement rate. Then, in response to a sufficiently large change in physical orientation, the display-device may begin moving the viewing window across the GUI at the normal rate again.

As part of the process for determining whether an orientation change is "sufficiently large", the display-device may establish a stability region in the viewing window. The stability region may programmatically represent the smallest movement that a display-device may consider "sufficiently large". A display-device may establish the stability region around any bounded area in the viewing window and the display-device may show the stability region or establish it as a hidden virtual object.

After establishing the stability region, a display-device may move the stability region across the viewing window in accordance with detected physical-orientation changes. In some cases, a display-device may establish the stability region at a default position and then track how far the stability region has moved from the default position. In this way, the position of the stability region may indicate the amount of physical movement that a display-device has undergone since the stability region was established.

A display-device may use the distance that the stability region has moved, to determine if a corresponding physical movement is sufficiently large to begin moving the viewing window again. For example, a display-device may consider a physical movement sufficiently large when the corresponding stability-region movement causes the stability region to move beyond a predefined distance.

In some embodiments, the default position of the stability region may encompass a specified point in the viewing window. Then, the display-device may define the predefined distance as a distance at which the stability region no longer encompasses the specified point. In this way, the size and shape of the stability region may represent the smallest movement that the display-device considers "sufficiently large". In other cases, a display-device may define an actual predefined distance (e.g., a few degrees from the default position), without using a specified point.

In some implementations, the display-device may also establish a reticle in the viewing window. Then, the display-device may move the reticle in accordance with changes in the display-device's physical orientation and thereby determine that a change is sufficiently large based on the reticle's position. For example, a display-device that uses a moving reticle may keep the stability region stationary and determine that the reticle has moved beyond a predefined distance when the reticle moves outside of the stability region. As with the stability region, the display-device may show the reticle or use it as a hidden virtual object.

Once the display-device detects a sufficiently large physical movement, the device may begin moving the viewing window across the GUI at the normal movement rate again. In some implementations, the display-device may move the viewing window at another reduced rate temporarily after detecting the sufficiently large movement. For example, a display-device that stops the movement of the viewing window while the device is relatively still may initially move the viewing window at a reduced rate after beginning to move the viewing window again.

2. Example System and Display-Device Architecture

FIG. 1A illustrates an example system 100 for receiving, transmitting, and displaying data in the form of a wearable display-device. While FIG. 1A illustrates a display-device 102 as an example of a display-device, other types of display-devices could additionally or alternatively be used. As illustrated in FIG. 1A, head-mountable display-device 102 has frame elements including lens-frames 104, 106 and center frame support 108, lens elements 110, 112, and extending side-arms 114, 116. Center frame support 108 and extending side-arms 114, 116 are configured to secure display-device 102 to a user's face via a user's nose and ears, respectively.

Each of the frame elements 104, 106, and 108 and extending side-arms 114, 116 may be formed of a solid structure of plastic and/or metal, or may be formed of a hollow structure of similar material so as to allow wiring and component interconnects to be internally routed through display-device 102. Other materials may be possible as well.

One or more of each of lens elements 110, 112 may be formed of any material that can suitably display a projected image or graphic. Each of lens elements 110, 112 may also be sufficiently transparent to allow a user to see through the lens element. Combining these two features of the lens elements may facilitate an augmented reality or heads-up display where the projected image or graphic is superimposed over a real-world view as perceived by the user through lens elements 110, 112.

Extending side-arms 114, 116 may each be projections that extend away from lens-frames 104, 106, respectively, and may be positioned behind a user's ears to secure display-device 102 to the user. Extending side-arms 114, 116 may further secure display-device 102 to the user by extending around a rear portion of the user's head. Additionally or alternatively, for example, system 100 may connect to or be affixed within a head-mounted helmet structure. Other possibilities exist as well.

The system 100 may also include an on-board computing system 118, a video camera 120, a sensor 122, and a finger-operable touch pad 124. On-board computing system 118 is shown to be positioned on extending side-arm 114 of display-device 102; however, on-board computing system 118 may be provided on other parts of display-device 102 or may be positioned remote from display-device 102 (e.g., the on-board computing system 118 could be connected by wires or wirelessly connected to the display-device 102). The on-board computing system 118 may include a processor and memory, for example. The on-board computing system 118 may be configured to receive and analyze data from the video camera 120, the sensor 122, and the finger-operable touch pad 124 (and possibly from other sensory devices, user-interfaces, or both) and generate images for output by the lens elements 110 and 112. The on-board computing system 118 may additionally include a speaker or a microphone for user input (not shown). An example computing system is further described below in connection with FIG. 4.

The video camera 120 is shown positioned on the extending side-arm 114 of the display-device 102; however, the video camera 120 may be provided on other parts of the display-device 102. The video camera 120 may be configured to capture images at various resolutions or at different frame rates. Video cameras with a small form-factor, such as those used in cell phones or webcams, for example, may be incorporated into an example embodiment of the system 100.

Further, although FIG. 1A illustrates one video camera 120, more video cameras may be used, and each may be configured to capture the same view, or to capture different views. For example, the video camera 120 may be forward facing to capture at least a portion of the real-world view perceived by the user. This forward facing image captured by the video camera 120 may then be used to generate an augmented reality where computer generated images appear to interact with the real-world view perceived by the user.

The sensor 122 is shown on the extending side-arm 116 of the display-device 102; however, the sensor 122 may be positioned on other parts of the display-device 102. The sensor 122 may include one or more of a gyroscope or an accelerometer, for example. Other sensing devices may be included within, or in addition to, the sensor 122 or other sensing functions may be performed by the sensor 122, as will be explained further.

The finger-operable touch pad 124 is shown on the extending side-arm 114 of the display-device 102. However, the finger-operable touch pad 124 may be positioned on other parts of the display-device 102. Also, more than one finger-operable touch pad may be present on the display-device 102. The finger-operable touch pad 124 may be used by a user to input commands. The finger-operable touch pad 124 may sense at least one of a position and a movement of a finger via capacitive sensing, resistance sensing, or a surface acoustic wave process, among other possibilities. The finger-operable touch pad 124 may be capable of sensing finger movement in a direction parallel or planar to the pad surface, in a direction normal to the pad surface, or both, and may also be capable of sensing a level of pressure applied to the pad surface. The finger-operable touch pad 124 may be formed of one or more translucent or transparent insulating layers and one or more translucent or transparent conducting layers. Edges of the finger-operable touch pad 124 may be formed to have a raised, indented, or roughened surface, so as to provide tactile feedback to a user when the user's finger reaches the edge, or other area, of the finger-operable touch pad 124. If more than one finger-operable touch pad is present, each finger-operable touch pad may be operated independently, and may provide a different function.

Figure 1B:
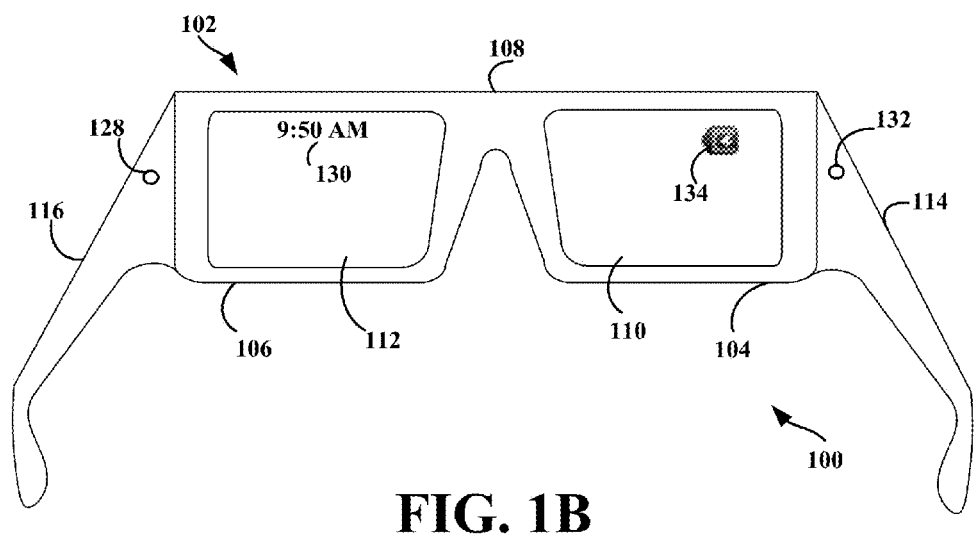
FIG. 1B illustrates an alternate view of the system illustrated in FIG. 1A.

FIG. 1B illustrates an alternate view of the system 100 illustrated in FIG. 1A. As shown in FIG. 1B, the lens elements 110, 112 may act as display elements. The display-device 102 may include a first projector 128 coupled to an inside surface of the extending side-arm 116 and configured to project a display 130 onto an inside surface of the lens element 112. Additionally or alternatively, a second projector 132 may be coupled to an inside surface of the extending side-arm 114 and configured to project a display 134 onto an inside surface of the lens element 110.

The lens elements 110, 112 may act as a combiner in a light projection system and may include a coating that reflects the light projected onto them from the projectors 128, 132. In some embodiments, a reflective coating may be omitted (e.g., when the projectors 128, 132 are scanning laser devices).

In alternative embodiments, other types of display elements may also be used. For example, the lens elements 110, 112 themselves may include: a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver may be disposed within the frame elements 104, 106 for driving such a matrix display. Alternatively or additionally, a laser or light emitting diode (LED) source and scanning system could be used to draw a raster display directly onto the retina of one or more of the user's eyes. Other possibilities exist as well.

Figure 2A:
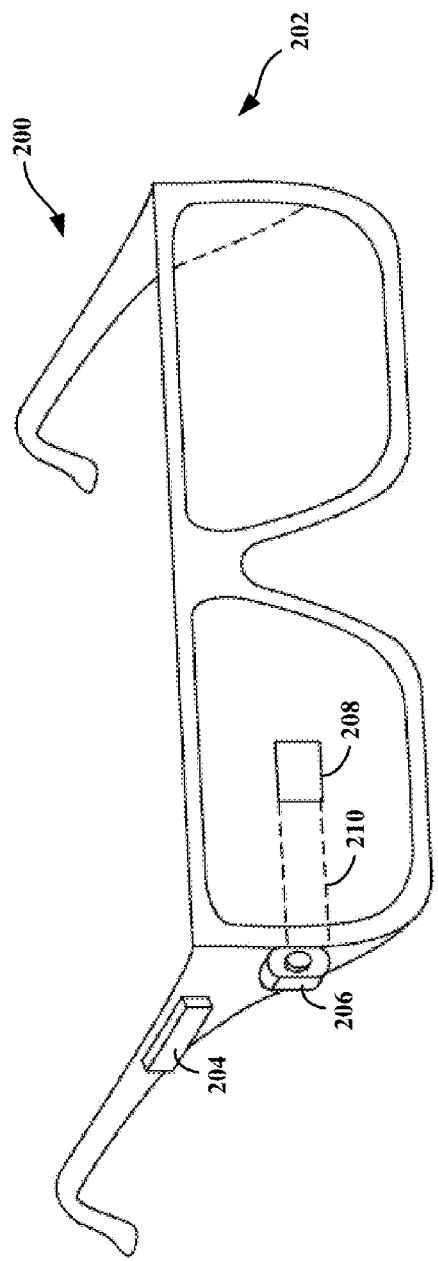
FIG. 2A illustrates an example system for receiving, transmitting, and displaying data.

FIG. 2A illustrates an example system 200 for receiving, transmitting, and displaying data. The system 200 is shown in the form of a wearable display-device 202. The display-device 202 may include frame elements and side-arms such as those described with respect to FIGS. 1A and 1B. The display-device 202 may additionally include an on-board computing system 204 and a video camera 206, such as those described with respect to FIGS. 1A and 1B. The video camera 206 is shown mounted on a frame of the display-device 202; however, the video camera 206 may be mounted at other positions as well.

As shown in FIG. 2A, the display-device 202 may include a single display 208 which may be coupled to the device. The display 208 may be formed on one of the lens elements of the display-device 202, such as a lens element described with respect to FIGS. 1A and 1B, and may be configured to overlay computer-generated graphics in the user's view of the physical world. The display 208 is shown to be provided in a center of a lens of the display-device 202; however, the display 208 may be provided in other positions. The display 208 is controllable via the computing system 204 that is coupled to the display 208 via an optical waveguide 210.

Figure 2B:
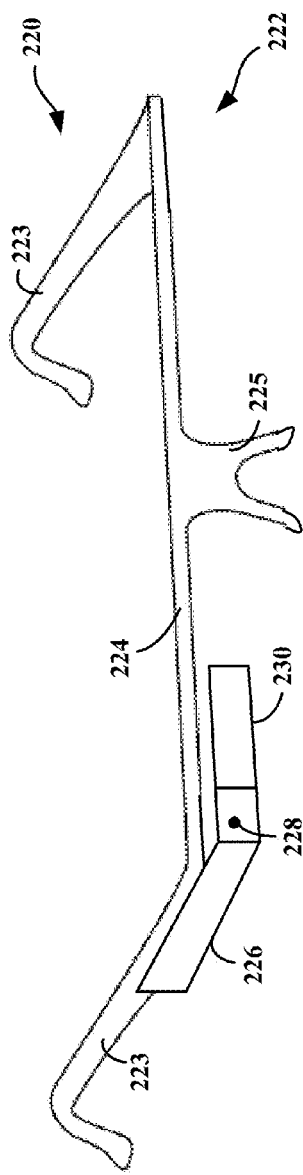
FIG. 2B illustrates an example system for receiving, transmitting, and displaying data.

FIG. 2B illustrates an example system 220 for receiving, transmitting, and displaying data. The system 220 is shown in the form of a wearable display-device 222. The display-device 222 may include side-arms 223, a center frame support 224, and a bridge portion with nosepiece 225. In the example shown in FIG. 2B, the center frame support 224 connects the side-arms 223. The display-device 222 does not include lens-frames containing lens elements. The display-device 222 may additionally include an on-board computing system 226 and a video camera 228, such as those described with respect to FIGS. 1A and 1B.

The display-device 222 may include a single lens element 230 that may be coupled to one of the side-arms 223 or the center frame support 224. The lens element 230 may include a display such as the display described with reference to FIGS. 1A and 1B, and may be configured to overlay computer-generated graphics upon the user's view of the physical world. In one example, the single lens element 230 may be coupled to a side of the extending side-arm 223. The single lens element 230 may be positioned in front of or proximate to a user's eye when the display-device 222 is worn by a user. For example, the single lens element 230 may be positioned below the center frame support 224, as shown in FIG. 2B.

FIG. 3 shows a simplified block diagram of an example computer network infrastructure. In system 300, a device 310 communicates using a communication link 320 (e.g., a wired or wireless connection) to a remote device 330. The device 310 may be any type of device that can receive data and display information corresponding to or associated with the data. For example, the device 310 may be a heads-up display-device, such as the display-device 102, 200, or 220 described with reference to FIGS. 1A-2B.

Thus, the device 310 may include a display system 312 comprising a processor 314 and a display 316. The display 316 may be, for example, an optical see-through display, an optical see-around display, or a video see-through display. The processor 314 may receive data from the remote device 330, and configure the data for display on the display 316. The processor 314 may be any type of processor, such as a microprocessor or a digital signal processor, for example.

The device 310 may further include on-board data storage, such as memory 318 coupled to the processor 314. The memory 318 may store software that can be accessed and executed by the processor 314, for example.

Remote device 330 may be any type of computing device or transmitter including a laptop computer, a mobile telephone, or tablet computing device, etc., that is configured to transmit data to device 310. Remote device 330 and device 310 may contain hardware to enable Communication link 320, such as processors, transmitters, receivers, antennas, etc.

In FIG. 3, communication link 320 is illustrated as a wireless connection; however, wired connections may also be used. For example, communication link 320 may be a wired serial bus such as a universal serial bus or a parallel bus, among other connections. Communication link 320 may also be a wireless connection using, e.g., Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. Either of such a wired and/or wireless connection may be a proprietary connection as well. Remote device 330 may be accessible via the Internet and may include a computing cluster associated with a particular web service (e.g., social-networking, photo sharing, address book, etc.).

Figure 4:
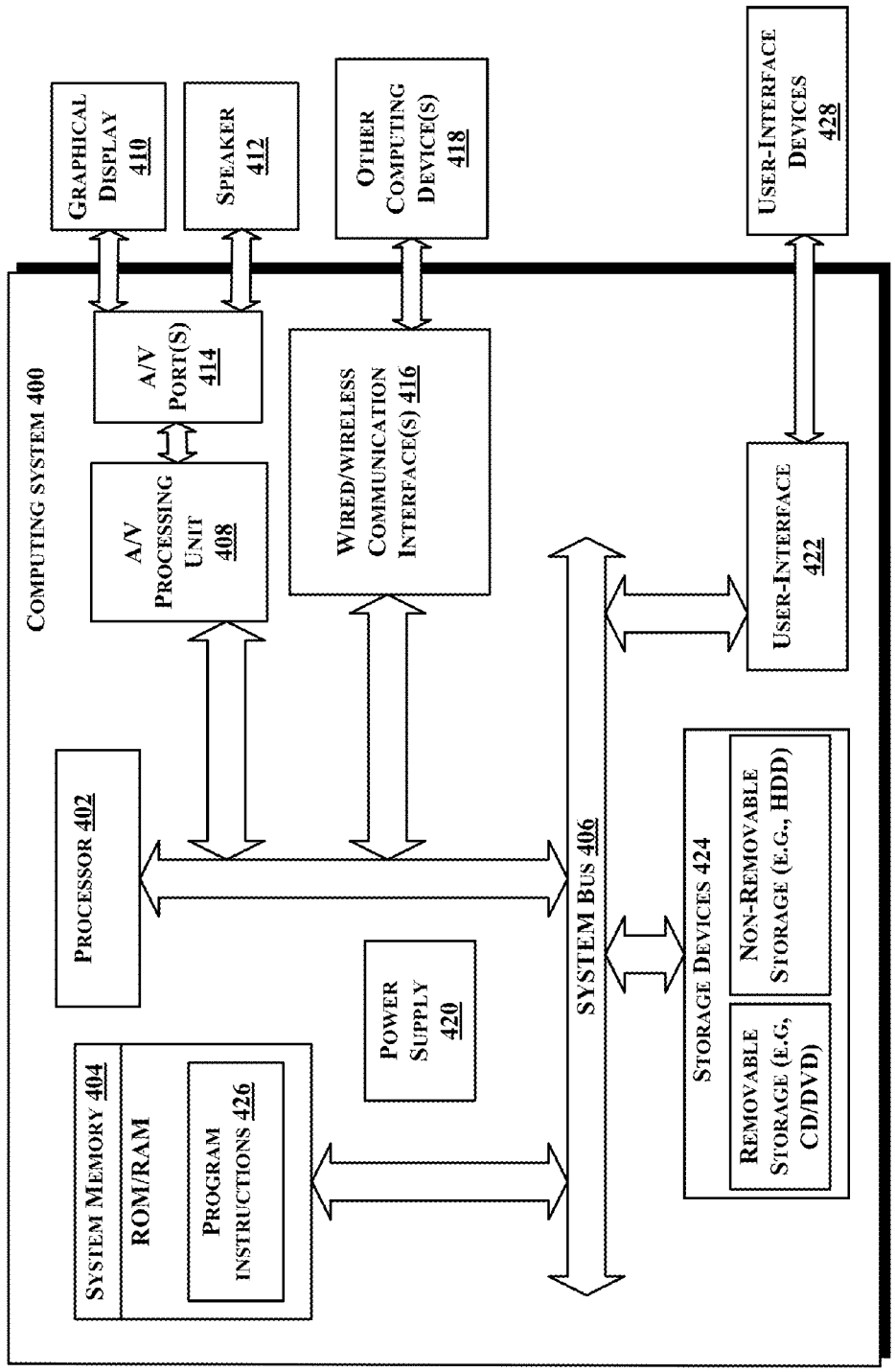
FIG. 4 is a simplified block diagram depicting example components of an example computing system.

As described above in connection with FIGS. 1A-2B, an example display-device may include, or may otherwise be communicatively coupled to, a computing system, such as computing system 118 or computing system 204. FIG. 4 shows a simplified block diagram depicting example components of an example computing system 400. One or both of the device 310 and the remote device 330 may take the form of computing system 400.

Computing system 400 may include at least one processor 402 and system memory 404. In an example embodiment, computing system 400 may include a system bus 406 that communicatively connects processor 402 and system memory 404, as well as other components of computing system 400. Depending on the desired configuration, processor 402 can be any type of processor including, but not limited to, a microprocessor (μP), a microcontroller (μC), a digital signal processor (DSP), or any combination thereof. Furthermore, system memory 404 can be of any type of memory now known or later developed including but not limited to volatile memory (such as RAM), non-volatile memory (such as ROM, flash memory, etc.) or any combination thereof.

An example computing system 400 may include various other components as well. For example, computing system 400 includes an A/V processing unit 408 for controlling graphical display 410 and speaker 412 (via A/V port 414), one or more communication interfaces 416 for connecting to other computing devices 418, and a power supply 420. Graphical display 410 may be arranged to provide a visual depiction of various input regions provided by user-interface module 422. For example, user-interface module 422 may be configured to provide a user-interface, such as the example user-interface described below, and graphical display 410 may be configured to provide a visual depiction of the user-interface. User-interface module 422 may be further configured to receive data from and transmit data to (or be otherwise compatible with) one or more user-interface devices 428.

Furthermore, computing system 400 may also include one or more data storage devices 424, which can be removable storage devices, non-removable storage devices, or a combination thereof. Examples of removable storage devices and non-removable storage devices include magnetic disk devices such as flexible disk drives and hard-disk drives (HDD), optical disk drives such as compact disk (CD) drives or digital versatile disk (DVD) drives, solid state drives (SSD), and/or any other storage device now known or later developed. Computer storage media can include volatile and nonvolatile, removable and non-removable media implemented in any method or technology for storage of information, such as computer readable instructions, data structures, program modules, or other data. For example, computer storage media may take the form of RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium now known or later developed that can be used to store the desired information and which can be accessed by computing system 400.

According to an example embodiment, computing system 400 may include program instructions 426 that are stored in system memory 404 (and/or possibly in another data-storage medium) and executable by processor 402 to facilitate the various functions described herein including, but not limited to, those functions described with respect to [METHOD FIGURES]. Although various components of computing system 400 are shown as distributed components, it should be understood that any of such components may be physically integrated and/or distributed according to the desired configuration of the computing system.

3. Example Device and System Operation

Figure 5:
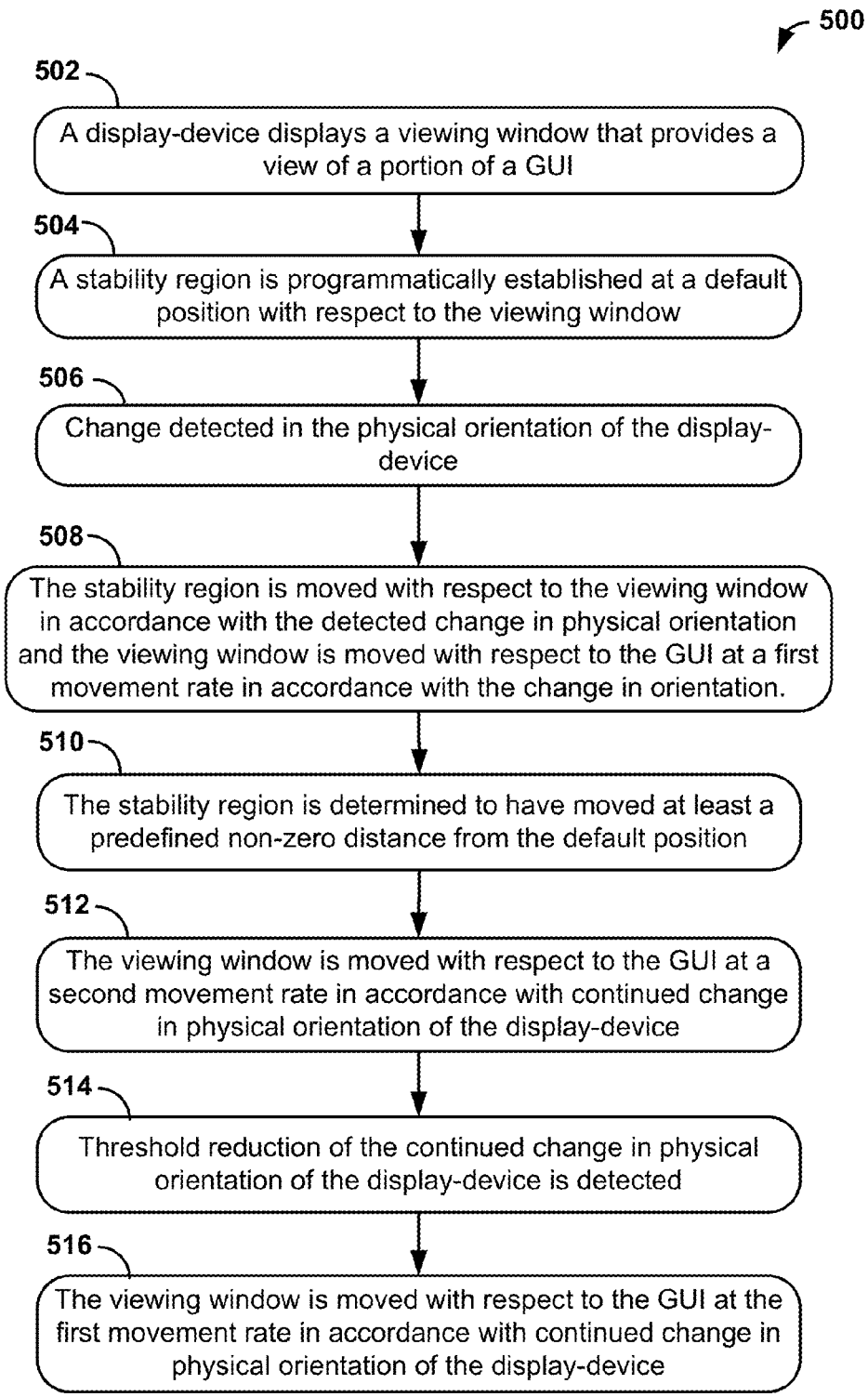
FIG. 5 is a simplified block diagram illustrating a method according to an exemplary embodiment.

FIG. 5 illustrates a method 500 according to an exemplary embodiment. Exemplary method 500 involves a display-device displaying a viewing window that provides a view of a portion of the GUI, as illustrated by block 502. Additionally, at block 504, the display-device programmatically establishes, at a default position with respect to the viewing window, a stability region. Further, at block 506, the display-device detects change in its own physical orientation. The method also involves the display-device moving stability region with respect to the viewing window in accordance with the detected change in physical orientation and moving the viewing window at a first movement rate with respect to the GUI, illustrated by block 508. At block 510, the display-device determines that the stability region has moved at least a predefined non-zero distance from the default position. Further, at block 512, the display-device moves the viewing window with respect to the GUI at a second movement rate in accordance with continued change in physical orientation of the display-device. Additionally, the display-device detects a threshold reduction of the continued change in the device's physical orientation, illustrated by block 514. And at block 516, in response to detecting the threshold reduction, the display-device moves the viewing window at the first movement rate in accordance with continued change in physical orientation of the display-device.

a. Displaying an Exemplary Viewing Window

Exemplary method 500 involves, as shown by block 502, a display-device displays a viewing window, with the viewing window showing a portion of a GUI. Generally, a display-device may display a viewing window as any graphical window. In particular, a system may tailor the characteristics and contents of the viewing window to suit the display-device, user-preferences, or the GUI that the viewing window shows.

Figure 6A:
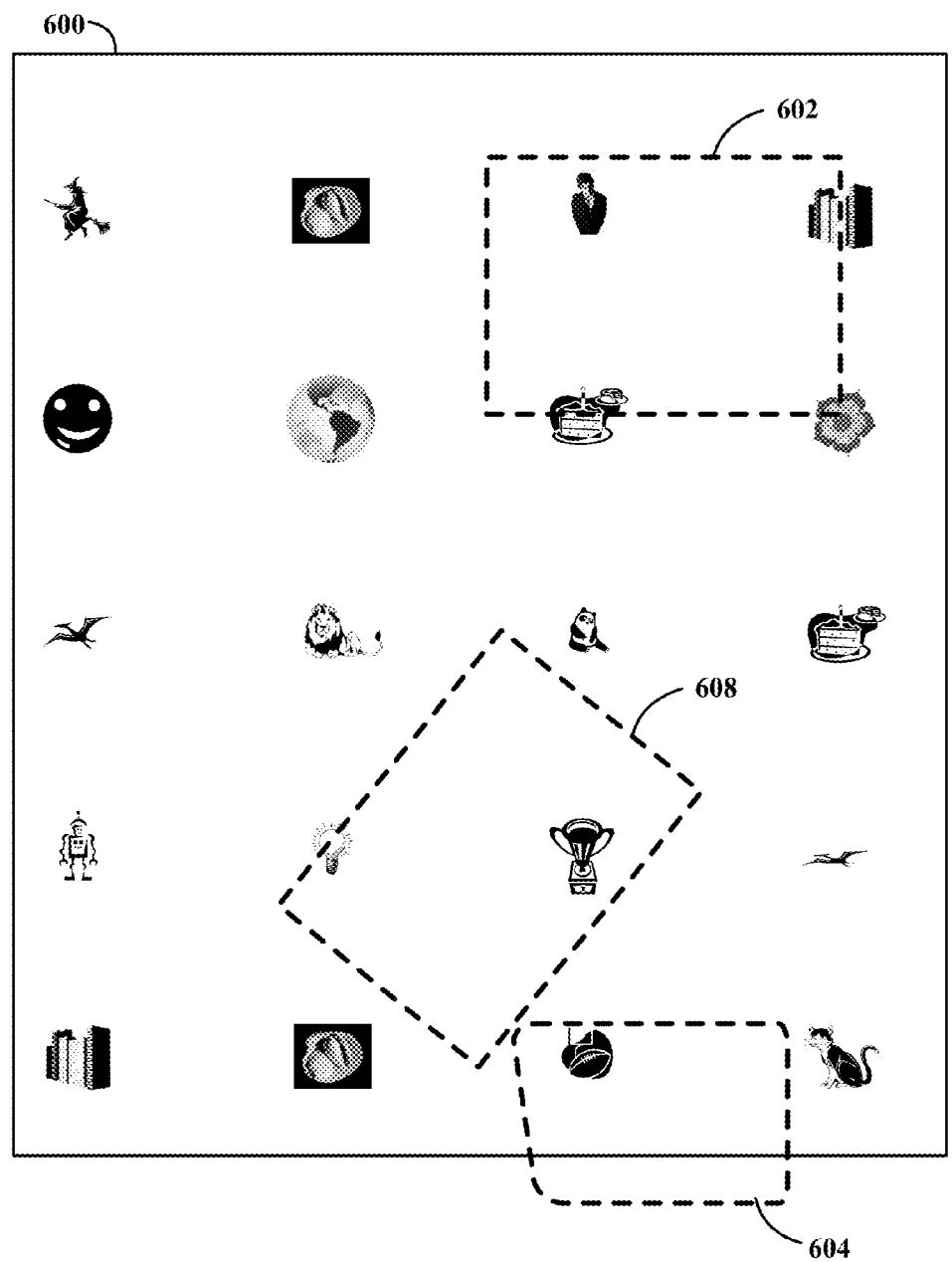
FIG. 6A shows an example graphical user-interface with a viewing window.

As explained in the overview, a viewing window may show a portion of a GUI. For example, FIG. 6A shows GUI 600 and portions 602, 604, and 608 of GUI 600 indicate exemplary portions of GUI 600 that a viewing window may show. These portions are simply examples, however, and a viewing window may also cover any other portion of a GUI.

In some embodiments, an exemplary system may allow a viewing window to show a portion of the GUI that does not entirely fill the viewing window. For example, portion 604, shows a portion of GUI 600 that fills only part of viewing window 604. In other embodiments, a system may prevent the viewing window from showing a portion of a GUI that does not fill the viewing window.

In some implementations, the viewing window may substantially fill the display element of the display-device. For example, if display-device 102 projects a viewing window on lens element 110, then, in one implementation, display-device 102 may display the viewing window over the entire lens element 110. Further, the viewing window may even substantially fill the field of view of a user. For example, if a display-device is mounted over a user's eyes (for instance, in a near-eye display-device), the user's field of view may be entirely occupied by the displaying element, which in turn may be entirely occupied by the viewing window.

Figure 6B:
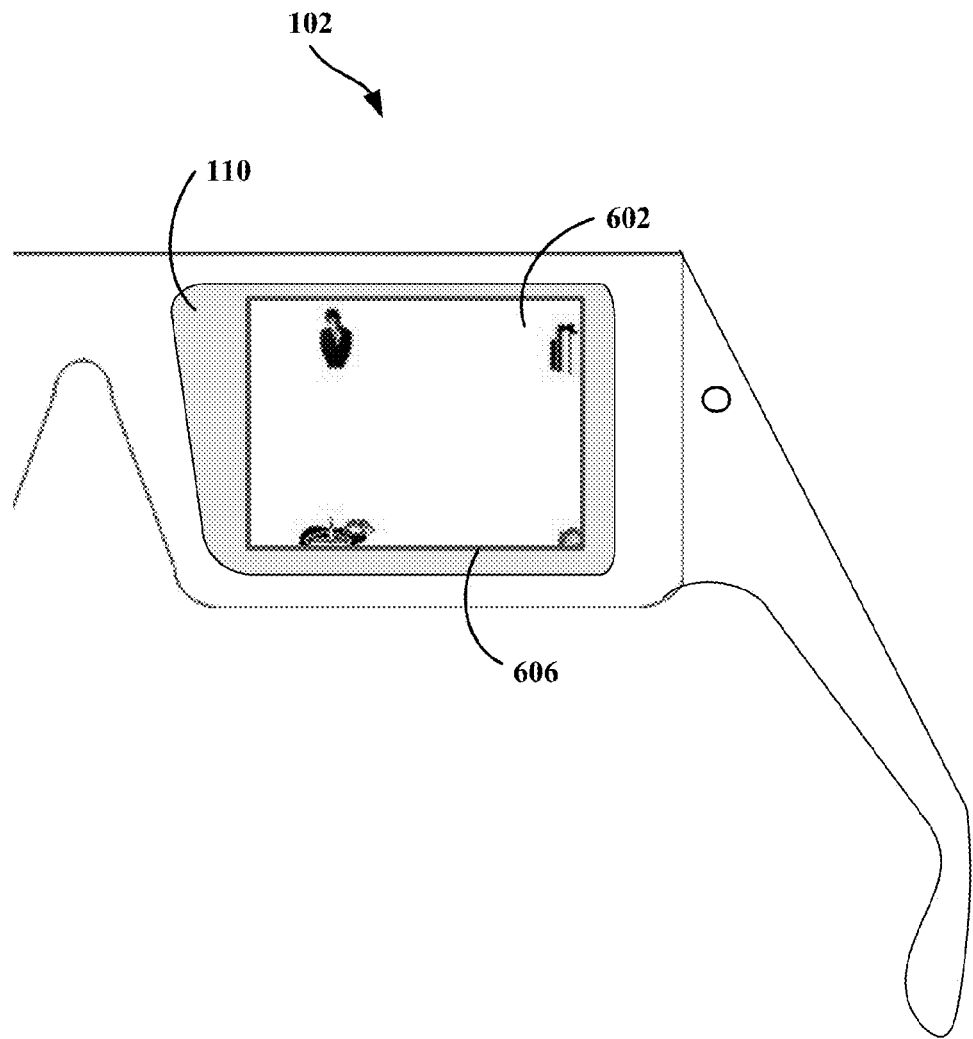
FIG. 6B shows aspects of an exemplary display-device, in use.

In some situations, a display-device may display a viewing window over only a portion of the device's display element. For example, FIG. 6B shows part of display-device 102 with a viewing window 606 displayed on lens element 110. As shown, viewing window 606, which shows portion 602 of GUI 600, covers only a portion of lens element 110. The system may the select and change the portion of the display element that the viewing window occupies. For example, if the display-device displays content other than the viewing window, the other content may cover or surround the viewing window. As another example, a display-device that displays virtual content over a user's physical field of view may select portions of the display element to leave unoccupied, so that the user may maintain some view of their physical environment.

A system may also select the shape of the viewing window. For instance, portion 604 of GUI 600 has a shape similar to that of lens element 110 of display-device 102. Hence, display-device 102 may select a similar shape for the viewing window that shows portion 604, to maximize the displayed area of the viewing window. In contrast, portions 602 and 608 of GUI 600 are rectangular in shape, implying that a rectangular viewing window may best display portions 602 and 608, as with viewing window 606 in FIG. 6B. In addition to the example shapes of portions 602, 604, and 608, a viewing window, and the portion of the GUI that a viewing window shows, may form any shape over the GUI. Such a shape need not be as simple as portions 602 and 604 and numerous examples are possible.

A system may also select and change the size of the viewing window with respect to the GUI. For example, a system may determine that a GUI contains a particular size of text. Then, based on user-preferences and application settings, for instance, the system may select the size of a viewing window so that the text is a readable size when displayed on the display-device.

The size and shape of a viewing window may be selected by a computing system based on a variety of factors. For example, a computing system may select the shape of a viewing window based on factors including the content of the GUI, user-preferences, user-input, the shape of display elements, the characteristics of other content on the display-device, system settings, and/or application settings. A system may also dynamically change the shape of an exemplary viewing window based on the same, or additional, factors. For example, if a GUI object moves across the GUI or changes size and/or shape, the viewing window may also change shape to maintain a view of the GUI object.

In some embodiments, a display-device may display a portion of a GUI in such a way as to give the impression that the GUI is occupying some apparent physical depth in front of the device. For instance, a stereoscopic head-mountable display may give the appearance that displayed GUI occupies a particular physical distance by displaying slightly transposed images of the GUI on each of two near-eye displays. A monocular display-device may give the impression of apparent distance, for instance, by projecting the image of a GUI through a lens element of a particular focal length. Then, the virtual object may appear to occupy a distance related to the focal length of the lens element. Other implementations are also possible.

In some embodiments, the viewing window may include a reticle (e.g., a cursor, indicator, pointer, or other pointing icon.) The system may move the reticle independently of the viewing window through input data (e.g., human-interface device and/or body movements of a user.) For example, a display-device may track the head- and/or eye-movements of a user and move the reticle in accordance with the tracked movements. Through this process, a user may move the reticle to a particular position in the GUI or over a GUI object. In some embodiments, positioning the pointer over a GUI object may provide an action (e.g., an indication of selecting the GUI object.) Other methods for interacting with the content of a GUI are possible.

A display-device may change the portion of the GUI that it shows in the viewing window, based on a number of factors. As described in the overview, changes in the display-device's physical orientation may be used as a basis for moving the viewing window with respect to the GUI. However, the display-device may also temporarily slow the movement of the viewing window with respect to the GUI, as explained earlier. In particular, when changes in physical orientation are relatively small, the display-device may move the viewing window at a reduced movement rate. Then, in response to a sufficiently large change in physical orientation, the display-device may begin moving the viewing window with respect to the GUI at a faster movement rate.

b. Establishing an Exemplary Stability Region

As explained in the overview, in order to determine whether a change in orientation is large enough to indicate that a display-device should begin moving the viewing window at the faster movement rate, the device may establish a stability region in the viewing window. In this description, an orientation change that is large enough to indicate that a display-device should begin to move the viewing window will be termed "sufficiently large". A stability region may cover any portion of the viewing window and, as will be shown, the characteristics of the stability region may directly influence whether a particular orientation change is sufficiently large. Therefore, the display-device may select the characteristics of the stability region (such as the stability region's size, shape, and default position) to control which physical movements result in viewing window movement. Further, the display-device may alter the characteristics of the stability region after establishing it.

A display-device may select the size of the stability region based on various factors. For example, the display-device may select the size of the stability region to correspond with the size of a sufficiently large physical orientation change. For instance, if a display-device determines that a sufficiently large movement should be relatively small, then the device may establish a correspondingly small stability region. As another example, a display-device that is shakier than normal may determine that a sufficiently large movement should be larger (for instance, to avoid unintentionally moving the viewing window at a faster movement rate) and, therefore, the device may establish a similarly large stability region. As a further example, if a viewing window shows the entirety of a GUI object, then a display-device may establish a larger stability region than if only part of the GUI object is shown in the viewing window.

Additionally, a display-device may specify the shape of the stability region with respect to the viewing window. In particular, a display-device may select the shape of the stability region to correspond to the size of sufficiently large movements in particular directions. For example, a display-device may be programmed to require a larger physical movement in one direction than in another, in order to determine that the movement is sufficiently large. In this case, the display-device may establish a stability region that is larger on one side than another to indicate this anisotropy. Correspondingly, if the size of a sufficiently large orientation change is the same in every direction, then the display-device may establish a circular stability region.

Figure 7A:
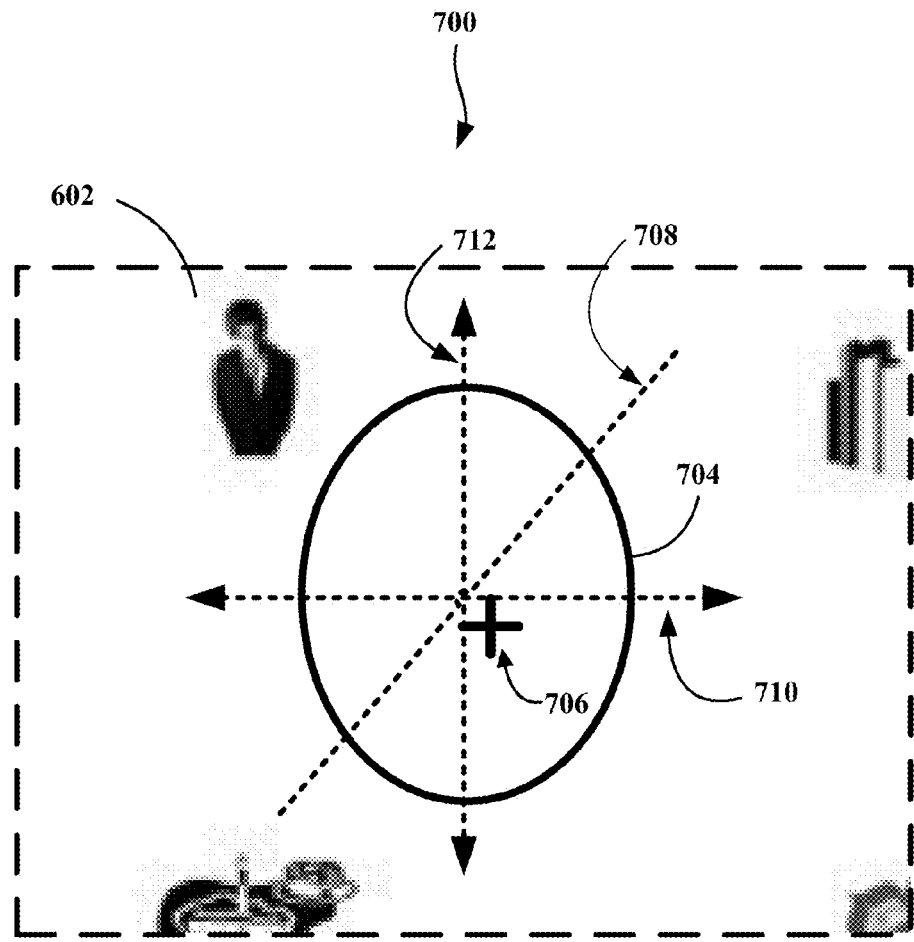
FIG. 7A shows an example viewing window from FIG. 6A in greater detail, including a stability region.

FIG. 7A shows an exemplary stability region 704, which is asymmetric across at least one axis (for instance, across axis 708). In FIG. 7A, viewing window 700 contains stability region 704 and shows portion 602 of GUI 600. As shown, stability region 704 is oval-shaped and is shorter along horizontal axis 710 than along vertical axis 712. Hence, the display-device that displays viewing window 700 may require a larger physical movement in the vertical direction than in the horizontal direction, in order to determine that a movement is sufficiently large.

In some embodiments, the size of a sufficiently large orientation change in one direction may directly relate to the size of a stability region in the opposite direction. For instance, if a sufficiently large movement is a movement that causes the stability region to move to a position at which the stability region no longer encompasses a specified point, as described in the overview, then the size of a sufficiently large movement to the right is dependent on the distance of the specified point from the left edge of the stability region. Hence, in this scenario, a stability region that is larger on the right side would correspond to a display-device requiring a larger movement to the left, in order to determine that a movement is sufficiently large.

In some embodiments, as part of selecting the shape of a stability region, a display-device may determine that the viewing window is more likely to be moved in particular directions across the GUI than in other directions. A display-device may base such a determination on a number of factors. For example, if a display-device is running a roadmap application that shows, in a viewing window, a map of a coastal area, the roadmap application may include application data that indicates that users are less likely to inspect landless portions (i.e. portions that are all water) of the map. Then, the display-device may access the application data and, based on this application data, determine that the viewing window is less likely to be moved in a direction from land toward the water. As another example, if a display-device has previously moved the viewing window in a downward direction across the GUI (for example, reading a document from top to bottom) the display-device may determine that the viewing window will more likely continue moving in the downward direction. As a further example, user-preferences may indicate that all viewing windows are more likely to be moved in one or more particular directions, because a user often traverses GUIs in one of these directions. Many other examples are possible.

After a display-device determines that the viewing window is more likely to be moved across the GUI in one or more particular directions, the display-device may use this determination as a basis for adjusting the shape of the stability region. For example, if a display-device determines that the viewing window is more likely to be moved either left or right across the GUI, rather than up or down across the GUI, then the display-device may increase the size of the stability region in the up and down directions. Such a situation may result in a stability region similar to stability region 704. In one respect, increasing the size of the stability region in the less-likely directions (or decreasing the size of the stability region in the more-likely directions) may help reduce the likelihood of unintentional movement in the less-likely directions, because movement in these directions would require a larger "sufficiently large" physical movement. As another example, a display-device may specify a circular stability region after determining that a viewing window is equally likely to be moved in any direction across the GUI.

A display-device may also alter the shape of a stability region in response to determining that one or more GUI objects are only partially shown in the viewing window. For example, if the portion of a GUI shown in the viewing window contains half of an image, the display-device may shorten the stability region in the direction of the remainder of the image, so that the viewing window may be readily movable to show the remainder of the image. As another example, if a GUI contains separated GUI objects that are related to each other (for instance, separated passages of text describing similar themes), then the display-device may create a hidden GUI object linking the related GUI objects. Then, when either of the related GUI objects is shown in a viewing window, the display-device may shorten the stability region in the direction of the other GUI object so that the device may be more responsive to movements between the related GUI objects.

Further, a display-device may select the default position at which the device establishes a stability region in the viewing window. For example, if the stability region is visible, a display-device may select the default position so that displaying the stability region does not obstruct content in the viewing window. As another example, if a cursor is used to select objects in the viewing window, the display-device may establish the stability region near or around the cursor. The display-device may also select the default position based on, for instance, user-input, user-preferences, content outside of the viewing window, device history, system characteristics, system preferences, stability region characteristics and/or many other factors.

In some implementations, after establishing a stability region, a display-device may dynamically alter the size and shape of the stability region. For example, user-preferences may specify that a display-device should automatically reduce stability regions in size as a function of the time. As another example, a display-device may detect that changes in the device's physical orientation have become smaller overall (e.g., a user has just stopped walking) Based on this detected information, the display-device may reduce the size of the stability region because random vibrations may be smaller or less frequent.

As another example, if a GUI contains media that changes with time (e.g., a video or interactive application) the display-device may monitor the changing media and dynamically alter the stability region based on how the media changes. For instance, an element of an interactive application (e.g., an application object that moves around the application window) may move outside of the portion of the GUI shown in a viewing window and, in response to determining that the virtual object has moved outside of the viewing window, a display-device may shorten the stability region in the direction that the virtual element moved. Other exemplary changes to the stability region are also possible.

c. Moving the Exemplary Stability Region

After establishing the stability region, a display-device may move the stability region with respect to the viewing window in accordance with detected changes in the physical orientation of the display-device. In some embodiments, the display-device may move the stability region in the same direction as the detected orientation changes (e.g., if the device turns down, the stability region moves down). In other embodiments, the stability region may move in the opposite direction as the detected changes (e.g., if the device turns down, the stability region moves up). Exemplary display-device may also move the stability region in other directions with respect to the direction of detected orientation changes.

While the display-device slows or stops the movement of the viewing window, with respect to the GUI, the movement of the stability region may track how the orientation of the display-device has changed since the display-device stabilized the viewing window. In order to track such orientation changes, the display-device may, before moving the stability region, store data representing the default position of the stability region. Then, as the stability region moves, the display-device may compare the current position of the stability region to its default position to determine how the orientation that the display-device has changed. Additionally or alternatively, a display-device may store data representing a specified point in the viewing window and use this specified point as a reference point for the default position of the stability region. For example, if a display-device specifies a point at the center of a stability region's default position, then, when the stability region moves, the distance that the stability region has moved from its default position would correspond to the distance of the specified point from the current center of the stability region.

The specified point need not be central in the stability region. For example, FIG. 7A shows specified point 706 that is slightly left and below the center of stability region 704. As will be shown, the display-device may use the position of the specified point to control whether an orientation change is determined to be sufficiently large. For example, as explained in the overview, a sufficiently large physical movement may correspond to a movement that causes the stability region to move to a position at which it no longer encompasses the specified point. Therefore, if the specified point is very close to a particular edge of the stability region, then a sufficiently large movement in the direction that will move the particular edge toward the specified point may be smaller than a sufficiently large movement in other directions.

Because the position of a specified point may influence whether certain physical movements are sufficiently large, the device may select the position of the specified point in much the same way that the device may select the size and shape of the stability region. For example, if a display-device determines that the viewing window is more likely to be moved in a particular direction, then the display-device may determine the edge of the stability region that corresponds with movement in the more-likely direction and specify a point that is closer to this edge. As another example, user-input may indicate that the display-device should always use the geometric center of the stability region as the specified point.

Figure 7B:
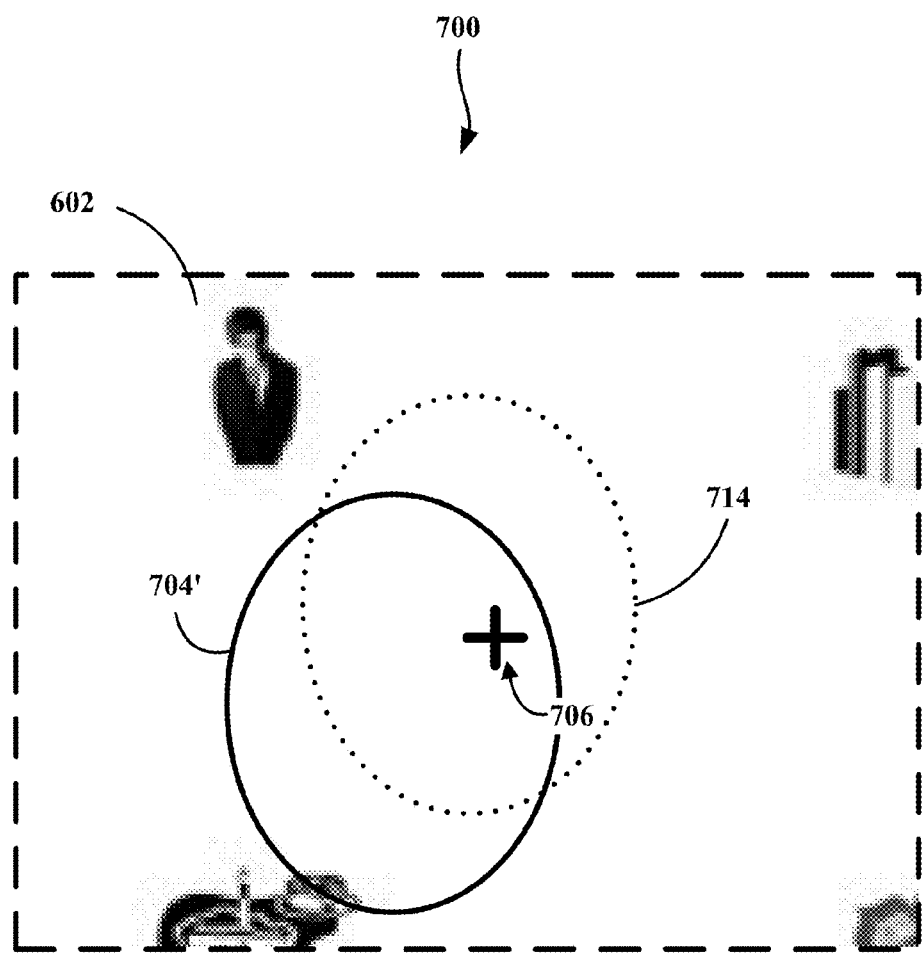
FIG. 7B shows the viewing window from FIG. 7A after the stability region has moved.
Figure 7C:
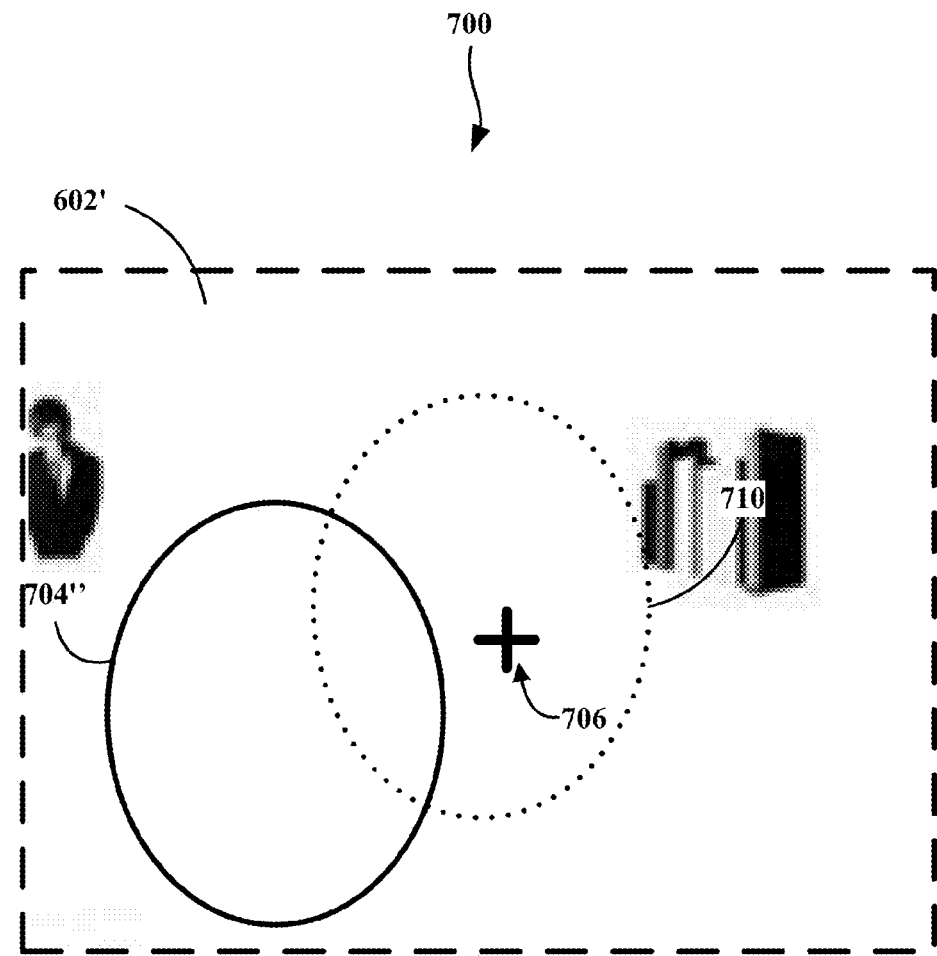
FIG. 7C shows the viewing window from FIG. 7A after the stability region has moved.

FIG. 7B and FIG. 7C show viewing window 700, from FIG. 7A, after the display-device has moved stability region 704. In both FIGS. 7B and 7C, the default position 714 of stability region 704 is shown. Further, in FIGS. 7B and 7C, the respective stability region 704' and 704" indicate respective positions of stability region 704 after moving away from default position 714. In the example of FIG. 7B, specified point 706 still falls within the moved stability region 704'. Therefore, in some embodiments, the example of FIG. 7B may illustrate the response of a display-device to a change in physical orientation that is not sufficiently large. In FIG. 7C, stability region 704" has moved to a position far enough from its default position 714 that specified point 706 is no longer contained in moved stability region 704". In some embodiments, this movement may be considered sufficiently large. Therefore, in response to the situation shown in FIG. 7C, viewing window 700 has moved with respect to GUI 600, so that viewing window 700 shows a different portion 602' of GUI 600.

In some cases, a display-device may dynamically change characteristics of the stability region based on movement of the stability region. For example, if a display-device moves the stability region back and forth along one axis in a pattern that suggests this movement is the result of random noise, then the display-device may elongate the stability region along this axis to avoid unintentional movement of the viewing window. Many other examples are possible.

Some display-devices may dynamically change the default position or the position of the specified point in response to the movement, or lack of movement, of the stability region. For example, if a display-device moves slightly (i.e., not a sufficiently large movement) after the viewing window has been slowed and, then, remains motionless in this new position for longer than a specified time, the display-device may move default position to the new stable position. For instance, if the situation depicted in FIG. 7B were maintained for a long time, the display-device may change the default position 714 of the stability region to the position of 704' or move specified point 706 into a more central position inside 704'. This technique may help prevent a display-device from misguidedly combining several small, unintentional orientation changes into a single sufficiently large change.

In some embodiments, a display-device may display the stability region only when the stability region is in motion. For example, a display-device may keep the stability region hidden while it is not moving and then, when the display-device changes orientation, the display-device may show the corresponding movement of the stability region from the previous position to its new position. In other embodiments, a display-device may present some type of notification to indicate that the stability region is moving. For example, a small indicator may appear on the display screen of a display-device whenever a stability region is in motion indicating the direction of the motion. In still other embodiments, the display-device may not display the stability region at all.

d. Exemplary Movement beyond a Predefined Non-Zero Distance

In order to determine whether the movement of a stability region represents a sufficiently large physical movement (i.e., a movement that is large enough to indicate that the viewing window should begin moving at the faster movement rate), a display-device may track the motion of the stability region. Then, when the stability region moves beyond a predefined non-zero distance, the display-device may begin moving the viewing window at the faster rate.

In some cases, this predefined non-zero distance may be an actual distance from the default position (e.g., twenty pixels, five millimeters, two degrees, etc.). In such implementations, a display-device may also define different non-zero distances for movements in different directions and/or change the distance(s) dynamically. In this way, a display-device may control the size and directionality of a sufficiently large movement, without changing the actual characteristics of the stability region.

Alternatively, a display-device may define the non-zero distance as a distance at which the specified point is no longer within the stability region. For example, stability region 704', in FIG. 7B, has not moved beyond such a predefined distance, because specified point 706 is still within moved stability region 704'. In contrast, stability region 704", in FIG. 7C has moved to a point at which specified point 706 is no longer inside of stability region 704". Hence, the example of FIG. 7C shows an exemplary situation in which the stability region has moved beyond a type of predefined distance.

Once the stability region has moved beyond the predefined distance, the display-device may move the viewing window across the GUI in accordance with detected orientation changes. For example, the content 602' of viewing window 700 in FIG. 7C has shifted as a result of the stability region moving beyond the predefined non-zero distance. In particular, content 602' has shifted in the opposite direction that stability region 704" has moved away from its default position 710. In other embodiments, a display-device may move the stability region in other directions with respect to the direction that the device moves the viewing window. For instance, in some embodiments, a display-device may move the stability region in the same direction as the device moves the viewing window.

In some embodiments, while the display-device is moving the viewing window at the faster movement rate, the display-device may keep the stability region at a particular position in the viewing window. For example, the display-device may move the stability region to its default position while the viewing window is moving or leave the stability region at the position at which the stability region was determined to have moved at least the non-zero distance. In such an embodiment, the situation of FIG. 7C may not be possible, since FIG. 7C shows a stability region 704" that has moved well beyond a predefined non-zero distance, while viewing window 700 has already begun moving with respect to GUI 600. A display-device may, alternatively, continue to move the stability region after the viewing window moves at its faster rate. For instance, a display-device may cause the stability region to follow the viewing window around the GUI. As another example, a display-device may continue to move the stability region in accordance with user-input. The display-device may also simply remove the stability region from the viewing window and then establish a new stability region when the display-device becomes stable again.

e. Exemplary Embodiments Using a Moving Reticle

In some embodiments, a display-device may establish a reticle within the viewing window and move this reticle in accordance with detected changes in physical orientation. As with the stability region, establishing the reticle may involve either displaying or not displaying the reticle. In such an embodiment, the display-device may establish a stability region may around the reticle and hold the position of the stability region stationary with respect to the viewing window, while moving the reticle. Also, as with a moving-stability-region embodiment, the display-device may store the default position of the reticle and compare the default position to the current position of the reticle, in order to determine if the reticle has moved beyond a predefined non-zero distance.

Figure 7D:
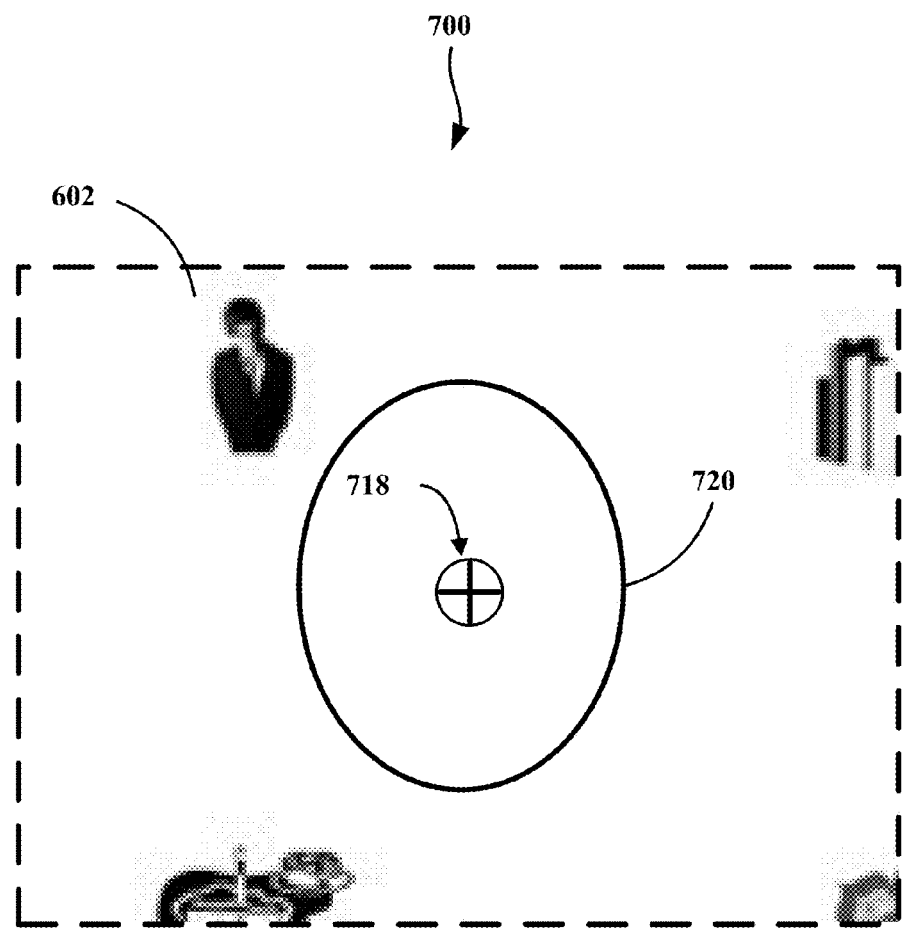
FIG. 7D shows an example viewing window from FIG. 6A in greater detail, including a stability region and a reticle.
Figure 7E:
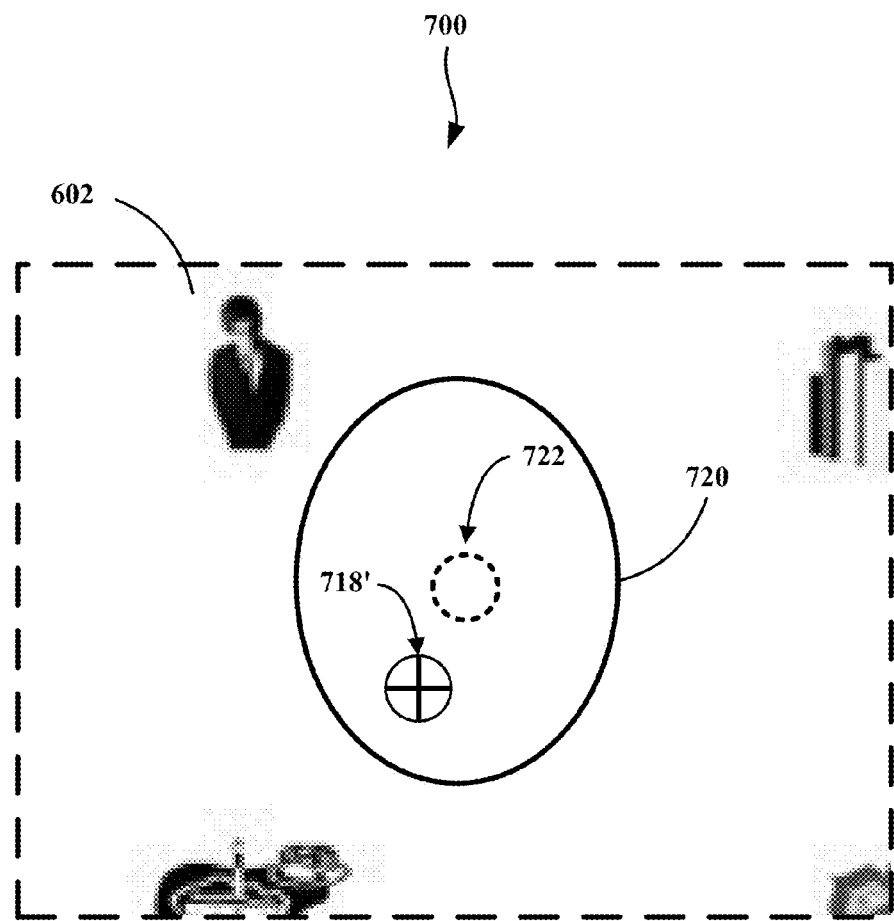
FIG. 7E shows the viewing window from FIG. 7D after the reticle has moved.
Figure 7F:
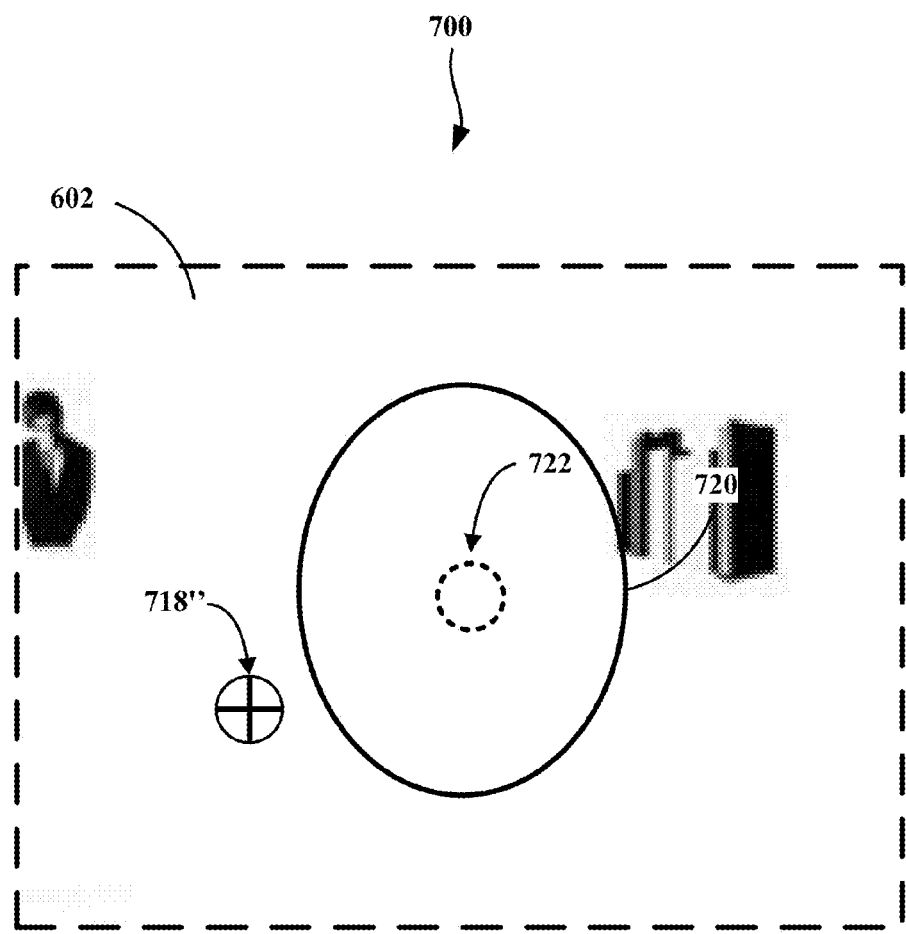
FIG. 7F shows the viewing window from FIG. 7D after the reticle has moved.

FIGS. 7D, 7E, and 7F illustrate an example of such an embodiment. FIG. 7D shows viewing window 700 from FIG. 6A in detail, with reticle 718 established within viewing window 700. The display-device has established a fixed stability region 720 that encompasses reticle 718. FIG. 7E shows viewing window 700 after the display-device detects a change in the display-device's physical orientation. In FIG. 7E, the display-device has moved reticle 718' away from its default position 722, but not outside of stability region 720. FIG. 7F shows viewing window 700 after further change in the physical orientation of the display-device has been detected. In FIG. 7F, the display-device has moved reticle 718" outside of stability region 720. In some implementations, the display-device may initiate movement of viewing window 700 based on the situation shown in FIG. 7F. Therefore, in response to the situation shown in FIG. 7F, viewing window 700 has moved with respect to GUI 600, so that viewing window 700 shows a different portion 602' of GUI 600. As with a moving-stability-region embodiment, the situation shown in FIG. 7F may not be possible in all embodiments. For instance, if a display-device does not move the reticle while the device moves the viewing window, then the reticle may not be movable to a position as far beyond the stability region as the position at which FIG. 7F shows reticle 718". In some embodiments, the reticle may not be movable beyond the stability region at all, because the display-device may stop moving the reticle, and begin moving the viewing window, as soon as the reticle reaches the edge of the stability region.

Embodiments using a moving reticle may employ any of the various embodiments described for implementations using a moving stability region. For example, a display-device may initially and dynamically alter the size and shape of a static stability region in a moving-reticle embodiment. As a further example, the predefined distance that a reticle may move, in order to activate movement of the viewing window, may be an actual distance instead of a distance at which the reticle is no longer within the stability region.

A display-device may display the reticle in the viewing window or track the position of the reticle without displaying it. In some embodiments, a display-device may display both the reticle and the stability region. While in other embodiments, the stability region may remain hidden while the reticle is displayed. Some implementations may also cause the display-device to display a reticle while the viewing window is moving at the faster movement rate. Many combinations of these features may also be used. For example, a display-device may display a reticle at all times but may only display a stability region when the orientation of the display-device is determined to be sufficiently still. As a further example, a display-device may display a reticle whenever the reticle is moving in accordance with a change in the display-device's physical orientation, but not display the stability region at all.

Some display-devices may combine a moving reticle and a moving stability region, with the stability region and the reticle each moving in accordance with a different input. For example, the stability region may move with respect to changes in physical orientation, while the reticle moves in accordance with user-input. In this case, viewing window movement may be activated by either moving the reticle outside of the stability region or moving the stability region away from the reticle. Other combinations are also possible.

f. Beginning to Move the Viewing Window

Once the display-device moves the stability region or reticle beyond a predefined distance, the display-device may begin to move the viewing window across the GUI at a faster movement rate according to continuing changes in detected orientation. Some display-devices may also use other factors as a basis for changing to the faster movement rate. For example, user-preferences, user-input, or system settings may specify to a display-device that, before beginning to move the viewing window, a stability region should remain beyond the predefined distance for at least a specified time. As another example, after moving the stability region beyond the specified distance, a display-device may prompt for user-input to confirm that the display-device should begin moving the viewing window. Many other examples are possible.

As explained in the overview, a display-device may move the viewing window in accordance with detected changes in the physical orientation of the display-device. Detecting changes in the physical orientation of the display-device may involve receiving, from one or more orientation sensors, data representing such a physical change. Such data may be termed movement data, and a display-device may receive movement data from internal sensors (as with sensor 122) or from externally connected sensors.

By way of example and without limitation, sensors may be any one or more of a motion detector (e.g., a gyroscope, an accelerometer, a camera, and/or a shock sensor), an impact sensor, a contact sensor (e.g., capacitive sensing device), a location determination device (e.g., a GPS device), a magnetometer, and an orientation sensor (e.g., a theodolite). Sensors may also include other detection elements and sensors may perform functions other than detection of movement data.

In some embodiments, the movement of the viewing window may mimic the experience of viewing a real-world object through a physical viewing window. For instance, a person who is inspecting a physical poster may turn their head upward to inspect the top of the poster and downward to inspect the bottom of the poster. Similarly, in response to detecting an upward or downward change in the orientation of a head-mounted display-device (corresponding to an upward or downward movement of the wearer's head), the display-device may move the viewing window up towards the top of the GUI, or down towards the bottom of the GUI, respectively.

Figure 8C:
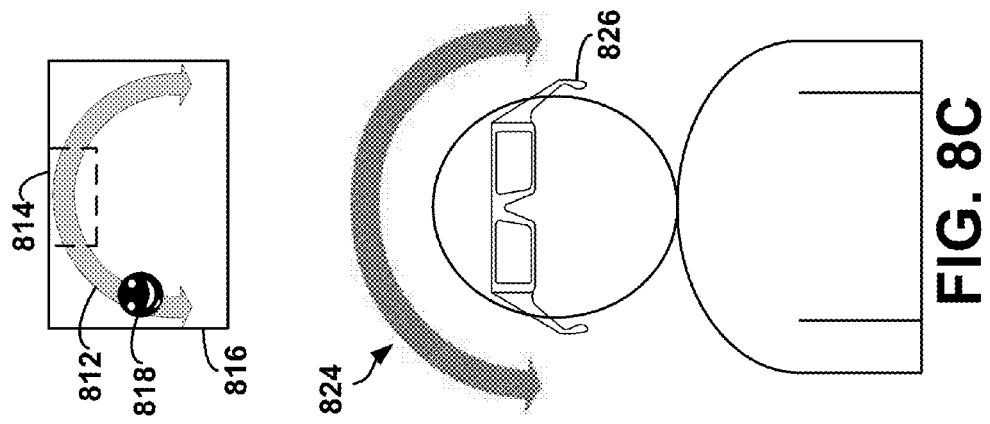
FIGS. 8A, 8B, and 8C illustrate exemplary changes in physical orientation of a display-device along with exemplary corresponding movements of the viewing window.
Figure 8B:
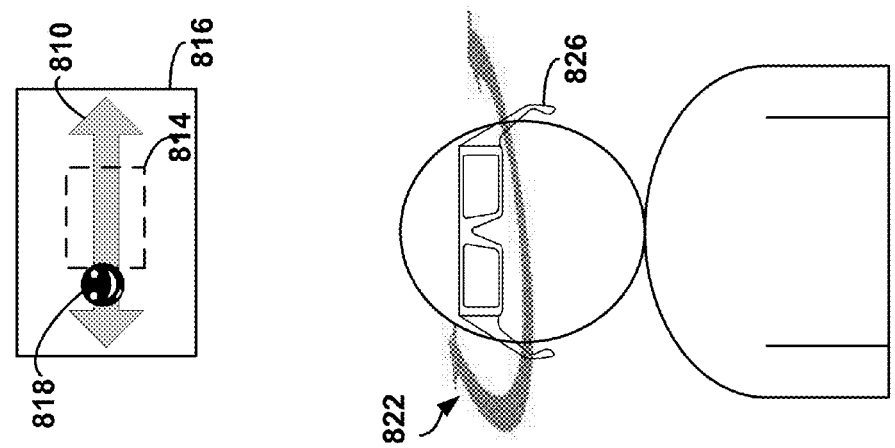
Figure 8A:
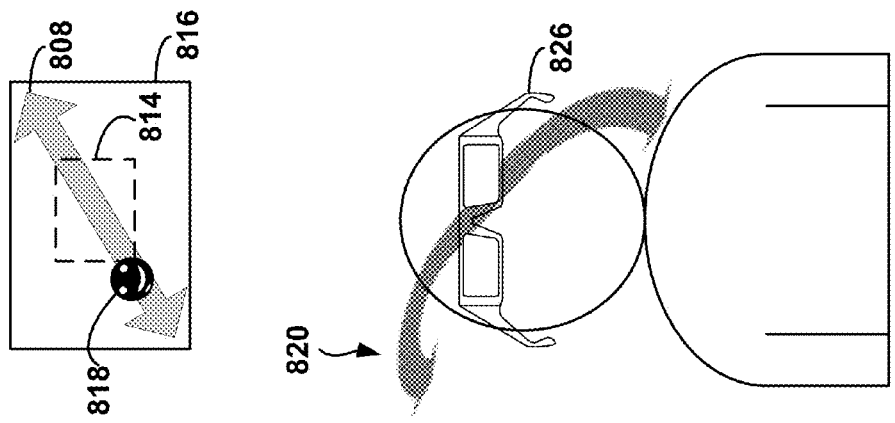

Some other exemplary orientation changes are illustrated in FIGS. 8A, 8B, and 8C. Each figure shows a head-mounted display-device 826 undergoing a physical orientation change (820, 822, or 824). Also, each figure shows a viewing window 814 that display-device 826 may display. In response to physical orientation changes 820, 822, and 824, viewing window 814 may move across a GUI 816, according to a particular movement pattern (808, 810, or 812).

In FIG. 8A, display-device 826 may include a variety of sensory configurations to receive data representing a diagonal movement 820. Based on the data representing diagonal movement 820, display-device 826 may move viewing window 814 with respect to GUI 816 in accordance with diagonal movement pattern 808. Such a movement may, for instance, cause viewing window 814 to move to a position in which GUI object 818 is shown in viewing window 814.

Similarly, in FIG. 8B, display-device 826 may utilize a variety of sensory configurations to receive movement data representing horizontal movement 822. Based on horizontal movement 822, display-device 826 may move viewing window 814 with respect to GUI 816 in accordance with horizontal movement pattern 810. Such a movement may, for instance, cause viewing window 814 to move toward GUI object 818.

Yet further, in FIG. 8C, display-device 826 may utilize a variety of sensory configurations to receive head-movement data from peripheral head-movement 824. Based on peripheral head-movement 824, display-device 826 may move viewing window 814 with respect to GUI 816 in accordance with peripheral movement pattern 812. Such a movement may, for instance, cause viewing window 814 to move to a show a portion of GUI 816 that contains GUI object 818. Other movements of the display-device are possible. Any combination of the movements described with respect to FIGS. 8A, 8B, and 8C and/or other movements may also be used.

In some embodiments, a display-device may receive movement data that is indicative of a movement from a first orientation to a second orientation. In the case of a head-mountable display-device, this movement may directly relate to the movement of a user's head from facing one direction to facing a different direction. For example, the aforementioned sensors may determine the difference between the first orientation of the display-device and the second orientation of the display-device by detecting a user's head-movements. In some instances, an accelerometer may track movement to determine the first orientation and the second orientation of the display-device.

The physical movements in FIGS. 8A, 8B, and 8C show substantially rotational movements (i.e., changes in angular orientation, rather than position) of display-device 826. Movement data may also represent translational movement of the display-device. For example, the wearer of a head-mounted display-device may move their body without turning their head (e.g., walking, climbing, riding in a vehicle, etc.) A movement sensor may detect and track this as a movement of the display-device. Some exemplary systems may move the viewing window in accordance with translational movement, since translational movement does change the orientation of the display-device with respect to the physical environment. Other exemplary systems may ignore data representing translational movement, because the rotational position of the display-device is unaffected by translational movement. Still other systems may treat translational and rotational movements as separate user-input. For instance, the device may move the viewing window in accordance with detected rotational movements and change the size of the viewing window in accordance with detected translational movements.

In some embodiments, the movement of the viewing window across the GUI may relate to a defined relationship between viewing-window position and the physical orientation of the device. For example, a display-device may associate several positions of the viewing window with particular physical orientations of the device and, then, when the device detects that it is oriented at, or near, one of the particular physical orientations, the device may move the viewing window to the position associated with this detected orientation.

In particular, the display-device may select positions of the viewing window that are uniformly distributed across the GUI, defining a mesh of viewing window positions over the GUI. Then, the device may define an amount of physical orientation change that will cause movement from one specified position to another. The mesh-points, associated with positions of the viewing window, need not be spaced evenly, oriented in rectangular unit cells, or associated with GUI objects. Additionally, the particular positions of the viewing window need not be associated with particular orientations of the display-device. Rather, a display-device may move the viewing window based on detected movements and the movement rate, without using (or even in some cases, determining) the actual orientation of the device. Many other implementations are possible.

Figure 9:
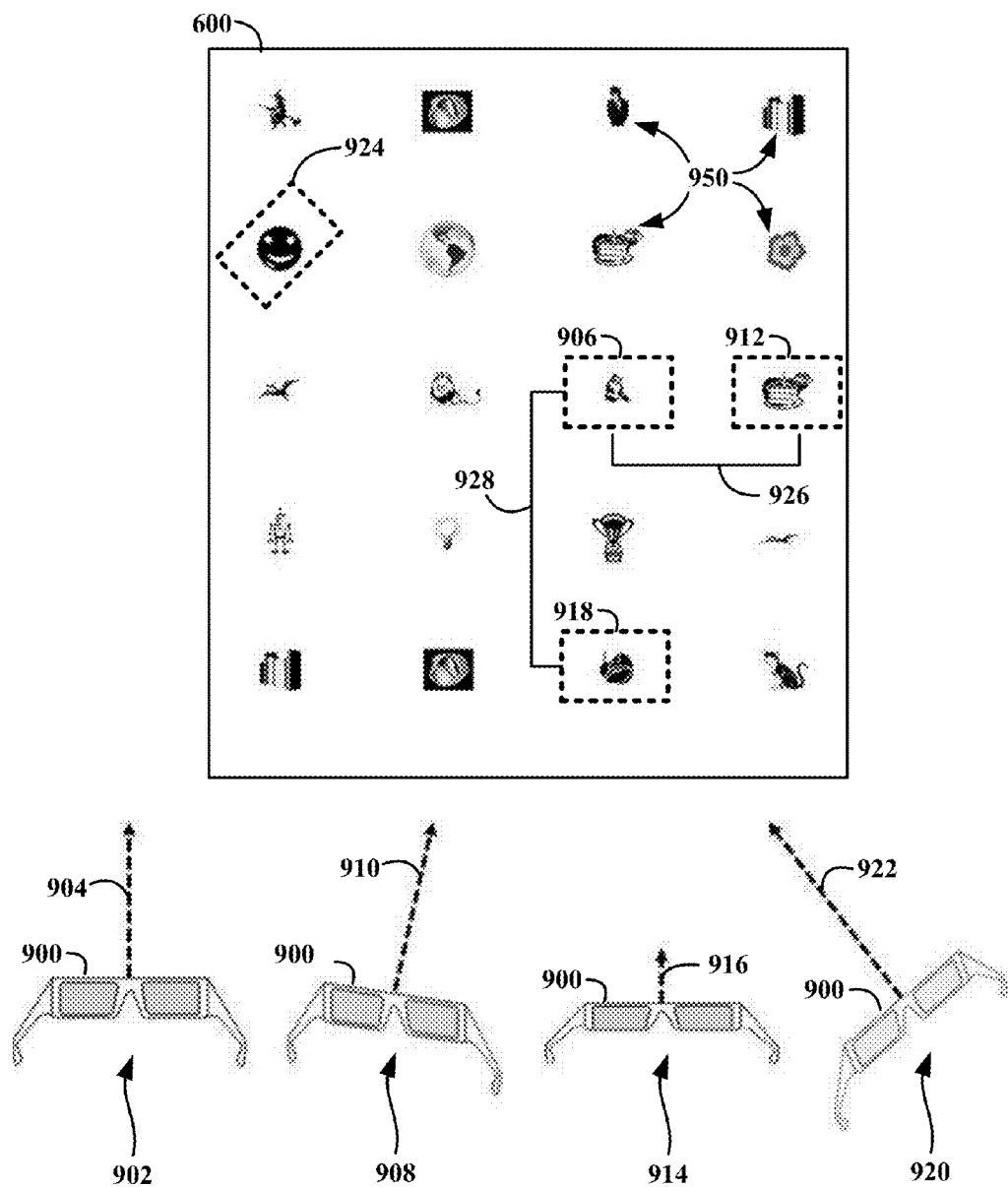
FIG. 9 shows several exemplary viewing windows overlaying a graphical user-interface along with exemplary physical orientations of a display-device.

As a particular example, FIG. 9 shows GUI 600 with GUI objects (for example, GUI objects 950) organized across GUI 600. FIG. 9 also shows several viewing-window positions (906, 912, 918, and 924) overlaying GUI 600 and several physical orientations (902, 908, 914, and 920) of display-device 900. The direction that display-device 900 is facing (904, 910, 916, and 922) at each orientation is also indicated.

In this example, each orientation (902, 908, 914, and 920) of display-device 900 may be associated with one of the viewing-window positions (906, 912, 918, and 924, respectively). For example, at orientation 902, display-device 900 may display a viewing window at position 906 with respect to GUI 600. Then, if display-device 900 turns a few degrees to the right (so that the orientation of display-device 900 corresponds with orientation 908), the display-device 900 may move the viewing window to position 912. Similarly, if display-device 900 turns a few degrees downward (from orientation 902 to orientation 914, for instance), then display-device 900 may move the viewing window from position 906 to position 918. In like manner, orientation 920 of display-device 900 may relate to viewing-window position 924, because orientation 920 shows a physical orientation that is a few degrees above, and several degrees to the left of, orientation 902. Orientation 920 (along with viewing-window position 924) also shows a clockwise rotation of a few degrees. The orientations and viewing window positions shown in FIG. 9 are for illustration. In addition to the shown examples a display-device may be oriented in many other orientations and a system may move a viewing window to many more positions (e.g., some positions may include multiple GUI objects or no GUI objects at all).

After detecting an orientation change, a display-device may use the magnitude of a detected orientation change as a basis for determining the magnitude of a resulting viewing-window movement. For example, a display-device may move the viewing window a predefined distance for each degree of physical orientation change that a display-device detects. Hence, an orientation change of ten degrees may cause the display-device to move the viewing window twice as far as an orientation change of five degrees would cause the device to move the viewing window. The ratio of physical orientation change to corresponding viewing-window movement may comprise the movement rate of the viewing window. An exemplary display-device may select this movement rate based on, for instance, user-input, user-preferences, characteristics of the viewing window, characteristics of the GUI, content of the GUI, device history, system characteristics, system preferences, stability region characteristics and/or many other factors.

In some implementations, a display-device may define the movement rate of the viewing window as the ratio of viewing-window movement to the amount of corresponding physical movement. For example, in FIG. 9, if the change in physical orientation from orientation 902 to orientation 908 is three degrees, then the display-device may define the movement rate of the viewing window as the ratio of three degrees of physical movement to the horizontal distance 926 that the viewing window moves (from position 906 to position 912) across the GUI. Then, if vertical distance 928 is twice as large as horizontal distance 926, the display-device may use the defined movement rate to determine that twice as much physical orientation change (in this example: six degrees) is needed in order to move the viewing window from position 906 to position 918. In this way, the display-device may associate distances across the GUI with corresponding sizes of physical movement. For instance, if the change in physical orientation, from orientation 902 to orientation 908, is three degrees, then the display-device may define the distance represented by horizontal distance 926 as three degrees of viewing-window movement. Further, once a device has defined the movement rate, any distance on the GUI may be associated with an apparent distance (for instance, in degrees) corresponding with the size of a physical movement that would cause a viewing window to move this apparent distance. For example, a device may associate the size of GUI elements with physical movements in a similar way as the scale on a map associates the dimensions of the map with the physical distance of geographic locations pictured.

As described above, in some embodiments a display device may move the viewing window at a slow movement rate when the device is relatively still and a faster movement rate in response to sufficiently large movements of the device. This faster movement rate may be referred to as a normal movement rate.

In some embodiments, the slower movement rate may be zero, so that the position of the viewing window is stabilized with respect to the GUI. In other cases, the slower movement rate may be greater than zero but slower than the other movement rates with which the display-device moves the viewing window.

In still other embodiments, the slower movement rate may be related to the distance that the stability region has moved from its default position. For example, a display-device may track the distance that a stability region moves from its default position. Then, the device may calculate the slower movement rate in relation to the distance by increasing the movement rate as the distance increases and decreasing the movement rate when the distance decreases. In particular, the display-device may calculate a multiplicative factor based on the distance and then reduce the normal movement rate by the multiplicative factor to calculate the slower movement rate. In some implementations, the display-device may increase the slower movement rate in such a way that, when the stability region has moved the threshold distance, the slower movement rate is the same as the normal movement rate. Other calculated movement rates are also possible.

In an embodiment where the slower movement rate is zero, the sudden transition from a stable viewing window to one moving at the normal movement rate may be surprising to some users. For at least this reason, a display-device may temporarily reduce the movement rate of the viewing window after detecting a sufficiently large movement. For example, temporarily reducing the movement rate may allow a user to perform slight movements across the GUI from one stable position to another (e.g., scrolling across only a few lines in a large text document).

In other embodiments, a display-device may temporarily move the viewing window at a movement rate that is faster than the "normal movement rate". Increasing the movement rate may, for instance, help a user to navigate efficiently away from a previous stable position. A display-device may also temporarily alter the movement rate of the viewing window for a variety of other reasons.

Some embodiments may involve a display-device altering the movement rate of the viewing window for a specified time immediately after beginning to move the viewing window. For example, if a display-device moves the viewing window at a faster rate of 1:1 (where one degree of physical orientation change causes the viewing window to move one degree of apparent distance across the GUI), then the display-device may initially move the viewing window at the temporary rate of 2:1 (where two degrees of physical change cause only one degree of apparent viewing-window movement). Alternatively, a display-device may temporarily move the viewing window at an increased temporary rate of 1:2 (in which one degree of orientation change causes an apparent movement of two degrees for the viewing window). Many other temporary movement rates are possible.

After moving the viewing window at the temporary movement rate, a display-device may switch to moving the viewing window at the normal movement rate. For instance, a display-device may change from a temporary movement rate to the normal movement rate as a function of time. For this purpose, at the same time that the viewing window begins moving at the temporary movement rate, the display-device may activate a timer to track elapsed time. Then, when the timer reaches a predefined time limit, the display-device may switch from moving the viewing window at the temporary rate to moving the viewing window at the normal rate.

Further, a display-device may change the movement rate in several steps, including multiple temporary increases and/or decreases in movement rate. As an example, a display-device may begin moving the viewing window at the reduced rate of 3:1, then change the movement rate to 2:1 at 0.5 seconds of elapsed time, change again to an increased rate of 1:4 at one second of elapsed time, and finally change to a normal rate of 1:1 at 1.5 seconds. In some cases, the movement rate may change in many monotonic steps so that the overall change from a temporary rate to a normal rate appears gradual. Many other examples are possible and the specific rates and procedures given in the examples above should not be taken as limiting or preferred.

A display-device may also track the distance that the viewing window has moved, and use this distance as a basis for adjusting the movement rate of a viewing window. For example, before beginning to move a viewing window at a temporary rate, an exemplary display-device may store data representing the original position of the viewing window. Then, each time the current position of the viewing window surpasses a preset distance from the original position, the display-device may change the movement rate of the viewing window. As one specific example, a display-device may begin moving the viewing window at a reduced temporary movement rate of 5:1. Then, each time the viewing window moves a set distance away from its original position, the display-device may increase the movement rate (for instance, 4:1 after two degrees, 3:1 after four degrees, etc.), until the movement rate reaches the normal rate. In some cases, a display-device may also use the total distance that the viewing window has moved (as opposed to only using the distance that the viewing window has moved away from its original position) as a basis for switching the movement rate of the viewing window. For example, if the viewing window moves circularly around the original position, the total distance moved may be much larger than the distance moved from the original position. As with the time-based implementation, a display-device may use the distance that a viewing window has moved as a basis for changing from an altered movement rate to a normal movement rate in one step, several steps, or so many steps that the overall effect appears gradual.

g. Re-stabilizing the Viewing Window

A display-device may again slow the movement of a viewing window across a GUI based on many factors. For example, a display-device may start moving the viewing window at the slower movement rate based on user-input, user-preferences, reduction in changes to physical orientation, reduction in gaze-tracked eye movement, system characteristics (e.g., processor use, battery life, etc.), lack of user-input, system-preferences and/or any combination of these factors. Other factors may also be used.

For example, the display-device may detect a threshold reduction in changes to the device's physical orientation and, in response to this detection, stabilize the position of the viewing window. A threshold reduction in change to the device's physical movement may represent a device's orientation remaining within a given movement limit (i.e., within a few degrees of a particular orientation) for a given time period. A display-device may determine the particular time period and the movement limits associated with a threshold reduction in orientation change based on, for instance, system-preferences, user-preferences, and/or past use characteristics.

Figure 10:
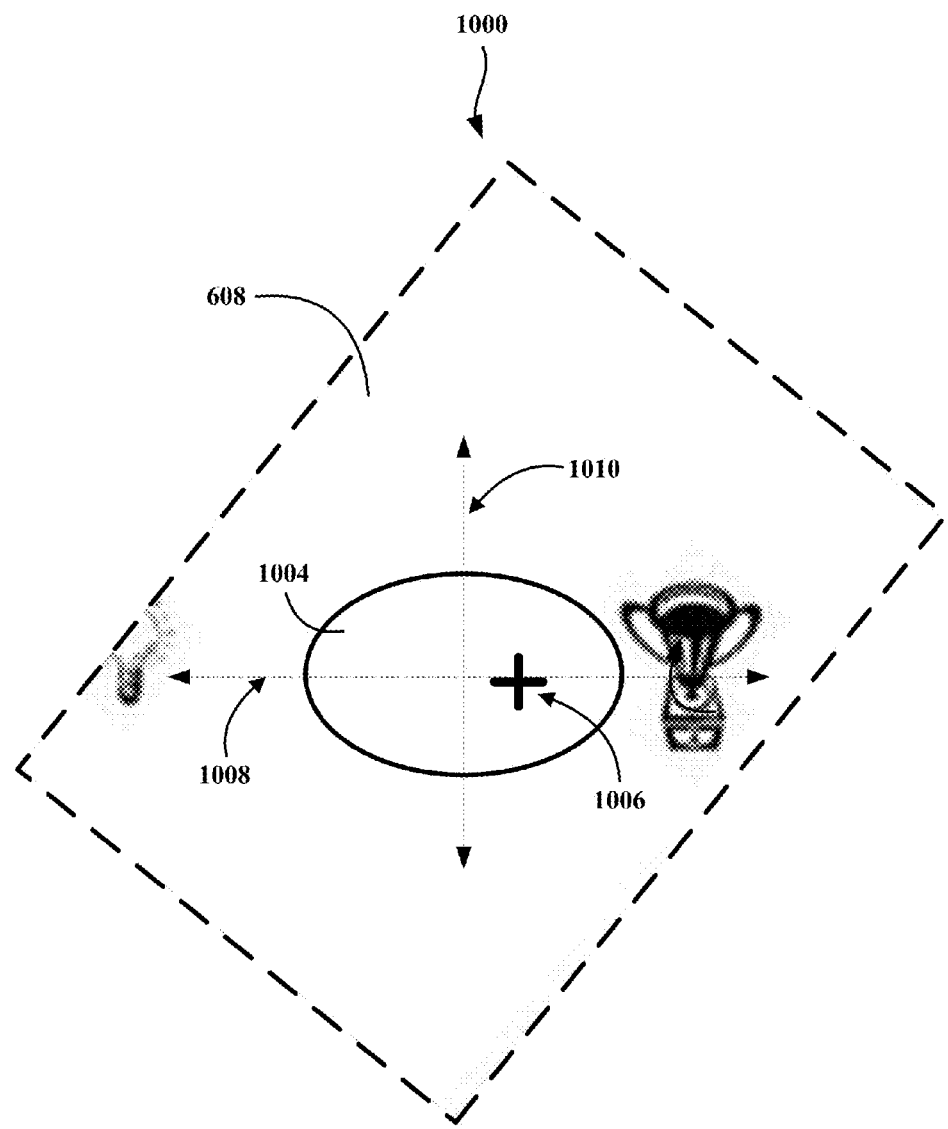
FIG. 10 shows the example graphical user-interface of FIG. 6A after the viewing window has moved.

FIG. 10 illustrates one example of a viewing window 1000 that is slowed to a movement rate of zero with respect to GUI 600, from FIG. 6A. In particular, viewing window 1000 is the same size and shape (other than an in-plane rotation) as viewing window 700, from FIG. 7A. Hence, viewing window 1000 may show the result of moving viewing window 700 with respect to GUI 600 to a new stable position. Specifically, viewing window 1000 shows portion 608 of GUI 600.

In some embodiments, when a display-device stabilizes a viewing window, the device may select a particular portion of the GUI to show in the stabilized viewing window. For instance, if the orientation of a display-device must remain within a movement limit for a given time period before the device determines a threshold reduction in orientation change, then the physical orientation of a display-device (and the viewing window) may continue to move slightly during this time period. In this case, the display-device may determine the average position that the viewing window occupied during the given time period and stabilize the viewing window at this average position. As another example, a display-device may show, in a stabilized viewing window, whatever portion of the GUI the viewing window showed at the end of the time limit. As a further example, a display-device may determine that a certain position of the viewing window is preferable for some reason and may responsively stabilize the viewing window at that position. For instance, if a threshold reduction in physical change is determined when the viewing window is showing a portion of the GUI that includes almost all of a certain GUI object, then the display-device may stabilize the viewing window at a position in which the viewing window shows the whole GUI object.

Once the display-device slows the movement rate of the viewing window with respect to the GUI, the display-device may establish a new stability region. For example, FIG. 10 shows new stability region 1004 established in viewing window 1000 around new specified point 1006. In this case, stability region 1004 is very similar in size to stability region 704, from FIG. 7A; but stability region 1004 is elongated along the horizontal axis 1008, whereas stability region 704 is elongated along vertical axis 712. In some cases, the display-device may always establish similarly sized stability regions.

In a moving-reticle implementation, a display-device may establish a new stability region around the reticle. For example, a display-device may continue to display or track the reticle during normal movement of the viewing window. Then, when movement slows, the display-device may establish a stability region encompassing the current position that the reticle. Alternatively, when movement slows, a device may move the reticle to a default position in the viewing window and establish a stability region around the reticle at this default position. If the reticle does not persist during normal viewing window movement, the display-device may simply establish a new reticle within the viewing window when movement stops.

After a display-device has slowed the movement rate of the viewing window with respect to the GUI, and established a stability region, the device may again move the stability region in accordance with newly detected changes in the orientation of the device. In this way, a display-device may repeat the process of successively decrease and increasing the movement rate of the viewing window across the GUI in response to detecting varying change in the device's physical orientation.

It should be understood that for situations in which the embodiments discussed herein collect and/or use any personal information about users or information that might relate to personal information of users, the users may be provided with an opportunity to opt in/out of programs or features that involve such personal information (e.g., information about a user's preferences or a user's contributions to social content providers). In addition, certain data may be anonymized in one or more ways before it is stored or used, so that personally identifiable information is removed. For example, a user's identity may be anonymized so that no personally identifiable information can be determined for the user and so that any identified user preferences or user interactions are generalized (for example, generalized based on user demographics) rather than associated with a particular user.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

I claim:

1. A method for controlled movement of a viewing window across a graphical user-interface (GUI), the method comprising:
   causing a display-device to display the viewing window, wherein the viewing window provides a view of a portion of the GUI;
   programmatically establishing, at a default position with respect to the viewing window, a first stability region;
   detecting change in physical orientation of the display-device;
   programmatically determining a movement of the first stability region with respect to the viewing window, wherein the movement is determined based on the detected change in physical orientation of the display-device;
   moving the first stability region according to the determined movement with respect to the viewing window, wherein the first stability region remains less than a predefined non-zero distance from the default position during a first portion of the movement;
   during the first portion of the movement, moving the viewing window with respect to the GUI at a first movement rate in accordance with the detected change in physical orientation;
   subsequent to the first portion of the movement, determining that the first stability region has thereby moved at least the predefined non-zero distance from the default position;
   in response to determining that the first stability region has moved at least the predefined non-zero distance from the default position, moving the viewing window with respect to the GUI at a second movement rate in accordance with continued change in physical orientation of the display-device, wherein the second movement rate is faster than the first movement rate;
   detecting a threshold reduction of the continued change in physical orientation of the display-device; and
   in response to detecting the threshold reduction, moving the viewing window with respect to the GUI at the first movement rate in accordance with the continued change in physical orientation of the display-device.

2. The method of claim 1, wherein the display-device comprises a head-mountable display.

3. The method of claim 1, wherein a wearable computer comprises the display-device, and wherein the wearable computer performs the method.

4. The method of claim 1, wherein the first movement rate is zero.

5. The method of claim 1, further comprising, tracking a distance that the first stability region has moved from the default position with respect to the viewing window, and wherein the first movement rate increases as a function of the distance that the first stability region has moved from the default position.

6. The method of claim 1, wherein the first stability region defines a geometric shape, and wherein the geometric shape of the stability region is asymmetric along at least one axis.

7. The method of claim 1, further comprising:
   determining that the portion of the GUI provided in the viewing window includes at least one GUI element that extends beyond the portion of the GUI provided in the viewing window in at least one direction; and
   in response to determining that the portion of the GUI provided in the viewing window includes at least one GUI element that extends beyond the portion of the GUI provided in the viewing window in at least one direction, reducing the predefined non-zero distance from the default position in the at least one direction.

8. The method of claim 1, wherein detecting the change in physical orientation of the display-device comprises receiving a first notification from one or more movement sensors indicating a detected change in physical orientation of the display-device; and
   wherein detecting the threshold reduction of the continued change in physical orientation of the display-device comprises receiving a second notification from the one or more movement sensors indicating the threshold reduction of the continued change in physical orientation of the display-device.

9. The method of claim 1, wherein the first stability region at the default position encompasses a particular point in the viewing window, and wherein the predefined non-zero distance from the default position is a distance at which the first stability region no longer encompasses the particular point in the viewing window.

10. The method of claim 9, wherein the particular point in the viewing window is a point representing a geometric center of the stability region at the default position.

11. The method of claim 1, wherein moving the viewing window with respect to the GUI at the second movement rate comprises:
    initially moving the viewing window with respect to the GUI at a third movement rate; and
    subsequently changing from moving the viewing window with respect to the GUI at the third movement rate to moving the viewing window with respect to the GUI at the second movement rate.

12. The method of claim 11, further comprising, after determining that the first stability region has moved at least the predefined non-zero distance from the default position, tracking a time elapsed since determining that the first stability region has moved at least the predefined non-zero distance from the default position, wherein subsequently changing from moving the viewing window with respect to the GUI at the third movement rate to moving the viewing window with respect to the GUI at the second movement rate is performed as a function of the elapsed time.

13. The method of claim 11, further comprising:
    before beginning to move the viewing window with respect to the GUI, storing data representing an initial position of the viewing window with respect to the GUI; and
    in response to determining that the first stability region has moved at least the predefined non-zero distance from the default position, tracking a distance that the viewing window has moved from the initial position of the viewing window with respect to the GUI, wherein subsequently changing from moving the viewing window with respect to the GUI at the third movement rate to moving the viewing window with respect to the GUI at the second movement rate is performed as a function of the distance that the viewing window has moved from the initial position of the viewing window with respect to the GUI.

14. The method of claim 13, wherein subsequently changing from moving the viewing window with respect to the GUI at the third movement rate to moving the viewing window with respect to the GUI at the second movement rate is performed gradually.

15. The method of claim 13, wherein subsequently changing from moving the viewing window with respect to the GUI at the third movement rate to moving the viewing window with respect to the GUI at the second movement rate is performed in one or more discrete steps, wherein each of the discrete steps is associated with a predefined value of the distance that the viewing window has moved from the initial position, and wherein each of the discrete steps is taken when the distance that the viewing window has moved from the initial position reaches the predefined value associated with the step.

16. The method of claim 1, further comprising, in response to detecting threshold reduction of the continued change in physical orientation of the display-device, programmatically establishing a second stability region in the viewing window.

17. The method of claim 1, further comprising in response to detecting threshold reduction of the continued change in physical orientation of the display-device, presenting a notification on the display-device.

18. The method of claim 17, wherein the notification comprises a visual notification displayed on the display-device.

19. The method of claim 17, wherein the notification comprises an audio notification played by the display-device.

20. A display-device comprising:
at least one processor; and
data storage comprising logic executable by the at least one processor to:
programmatically establish, at a default position with respect to the viewing window, a first stability region;
detect change in physical orientation of the display-device;
programmatically determine a movement of the first stability region with respect to the viewing window, wherein the movement is determined based on the detected change in physical orientation of the display-device;
move the first stability region according to the determined movement with respect to the viewing window, wherein the first stability region remains less than a predefined non-zero distance from the default position during a first portion of the movement;
during the first portion of the movement, move the viewing window with respect to the GUI at a first movement rate in accordance with the detected change in physical orientation;
subsequent to the first portion of the movement, determine that the first stability region has thereby moved at least the predefined non-zero distance from the default position;
in response to determining that the first stability region has moved at least the predefined non-zero distance from the default position, move the viewing window with respect to the GUI at a second movement rate in accordance with continued change in physical orientation of the display-device, wherein the second movement rate is faster than the first movement rate;
detect a threshold reduction of the continued change in physical orientation of the display-device; and in response to detecting the threshold reduction, move the viewing window with respect to the GUI at the first movement rate in accordance with the continued change in physical orientation of the display-device.

21. The display-device of claim 20, wherein the first movement rate is zero.

22. The display-device of claim 20, wherein the first stability region at the default position encompasses a particular point in the viewing window, and wherein the predefined non-zero distance from the default position is a distance at which the first stability region no longer encompasses the particular point in the viewing window.

23. A method for controlled movement of a viewing window across a graphical user-interface (GUI), the method comprising:
causing a display-device to display the viewing window, wherein the viewing window shows a portion of the GUI;
programmatically establishing in the viewing window (i) a reticle at a default position with respect to the viewing window and (ii) a first stability region, wherein the reticle at the default position is encompassed by the first stability region;
detecting change in physical orientation of the display-device;
programmatically determining a movement of the reticle with respect to the viewing window, wherein the movement is determined based on the detected change in physical orientation of the display-device;
moving the reticle according to the determined movement with respect to the viewing window, wherein the reticle remains less than a predefined non-zero distance from the default position during a first portion of the movement;
during the first potion of the movement, moving the viewing window with respect to the GUI at a first movement rate in accordance with the detected change in physical orientation of the display-device;
subsequent to the first portion of the movement, determining that the reticle has thereby moved outside of the stability region;
in response to determining that the reticle has moved outside of the stability region, moving the viewing window with respect to the GUI at a second movement rate in accordance with continued change in physical orientation of the display-device;
detecting a threshold reduction of the continued change in physical orientation of the display-device; and
in response to detecting the threshold reduction of the continued change in physical orientation of the display-device, moving the viewing window with respect to the GUI at the first movement rate in accordance with continued change in physical orientation of the display-device.

24. The method of claim 23, wherein the first movement rate is zero.

25. The method of claim 23, wherein the stability region defines a geometric shape, and wherein the geometric shape of the stability region is asymmetric along at least one axis.

26. The method of claim 23, further comprising, in response to at least detecting the threshold reduction of the continued change in physical orientation of the display-device, (i) programmatically establishing a second stability region in the viewing window and (ii) moving the reticle so that it is encompassed by the second stability region.

27. A non-transitory computer-readable medium having stored therein instructions executable by a processor to cause a display-device to perform functions for controlled movement of a viewing window across a graphical user-interface (GUI), the functions comprising:
  displaying the viewing window, wherein the viewing window defines a displayed portion of the GUI;
  programmatically establishing, at a default position with respect to the viewing window, a first stability region;
  detecting change in physical orientation of the display-device;
  programmatically determining a movement of the first stability region with respect to the viewing window, wherein the movement is determined based on the detected change in physical orientation of the display-device;
  moving the first stability region according to the determined movement with respect to the viewing window, wherein the first stability region remains less than a predefined non-zero distance from the default position during a first portion of the movement;
  during the first portion of the movement, moving the viewing window with respect to the GUI at a first movement rate in accordance with the detected change in physical orientation;
  subsequent to the first portion of the movement, determining that the first stability region has thereby moved at least the predefined non-zero distance from the default position;
  in response to determining that the first stability region has moved at least the predefined non-zero distance from the default position, moving the viewing window with respect to the GUI at a second movement rate in accordance with continued change in physical orientation of the display-device, wherein the second movement rate is faster than the first movement rate;
  detecting a threshold reduction of the continued change in physical orientation of the display-device; and
  in response to detecting the threshold reduction, moving the viewing window with respect to the GUI at the first movement rate in accordance with the continued change in physical orientation of the display-device.

28. The non-transitory computer-readable medium of claim 27, wherein detecting the change in physical orientation of the display-device comprises receiving a first notification from one or more movement sensors indicating a detected change in physical orientation of the display-device; and
  wherein detecting the threshold reduction of the continued change in physical orientation of the display-device comprises receiving a second notification from the one or more movement sensors indicating the threshold reduction of the continued change in physical orientation of the display-device.

29. The non-transitory computer-readable medium of claim 27, wherein moving the viewing window at the second movement rate comprises:
  initially moving the viewing window at a third movement rate; and
  subsequently changing from moving the viewing window at the third movement rate to moving the viewing window at the second moving rate.

30. The non-transitory computer-readable medium of claim 27, wherein the functions further comprise: in response to detecting the threshold reduction of the continued change in physical orientation of the display-device, programmatically establishing a second stability region in the viewing window.

* * * * *